US010538376B2

(12) United States Patent
Iguchi et al.

(10) Patent No.: US 10,538,376 B2
(45) Date of Patent: Jan. 21, 2020

(54) LAMINATED FILM AND PACKAGING CONTAINER

(71) Applicant: Toppan Printing Co., Ltd., Tokyo (JP)

(72) Inventors: Ikuno Iguchi, Tokyo (JP); Sachiko Sugaya, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 701 days.

(21) Appl. No.: 14/679,238

(22) Filed: Apr. 6, 2015

(65) Prior Publication Data

US 2015/0210463 A1   Jul. 30, 2015

Related U.S. Application Data

(63) Continuation of application No. PCT/JP2013/077945, filed on Oct. 15, 2013.

(30) Foreign Application Priority Data

Oct. 15, 2012   (JP) .................................. 2012-228075

(51) Int. Cl.
*B65D 81/34* (2006.01)
*B23B 27/08* (2006.01)
*B23B 3/02* (2006.01)
*B65D 65/40* (2006.01)
*B32B 3/26* (2006.01)
(Continued)

(52) U.S. Cl.
CPC ............ *B65D 81/3461* (2013.01); *B32B 3/02* (2013.01); *B32B 3/266* (2013.01); *B32B 7/12* (2013.01); *B32B 27/08* (2013.01); *B32B 27/308* (2013.01); *B32B 27/32* (2013.01); *B32B 27/34* (2013.01); *B32B 27/36* (2013.01); *B65D 65/40* (2013.01); *B32B 2307/31* (2013.01); *B32B 2307/54* (2013.01); *B32B 2307/582* (2013.01);
(Continued)

(58) Field of Classification Search
CPC ............ B32B 2307/31; B32B 2307/54; B32B 2307/582; B32B 2439/46; B32B 2439/70; B32B 27/08; B32B 27/308; B32B 27/32; B32B 27/34; B32B 27/36; B32B 3/02; B32B 3/266; B32B 7/12; B65D 65/40; B65D 81/3461; Y10T 428/24331
USPC .......................................... 219/725; 428/138
See application file for complete search history.

(56) References Cited

U.S. PATENT DOCUMENTS 6,596,355 B1    7/2003  Mita et al.
2005/0255276 A1* 11/2005  Bethune ................. B31D 1/021
                                           428/42.3

FOREIGN PATENT DOCUMENTS

JP         11-79260         3/1999
JP         2001-031148      2/2001
(Continued)

OTHER PUBLICATIONS

Machine Translation, JP 11-079260, Yotsuya et al., Mar. 23, 1999.*
(Continued)

*Primary Examiner* — Dana Ross
*Assistant Examiner* — James F Sims, III

(57) ABSTRACT

A laminated film includes: an inner layer formed of a heat-sealable thermoplastic resin; an outer layer laminated on the inner layer; and a fragile processed portion in which at least a part of the outer layer is removed and at least a part of the inner layer is present and which has a linear shape in planar view and a Young's modulus of 2.0 gigapascals or less.

13 Claims, 7 Drawing Sheets

(51) Int. Cl.
- *B32B 3/02* (2006.01)
- *B32B 7/12* (2006.01)
- *B32B 27/08* (2006.01)
- *B32B 27/30* (2006.01)
- *B32B 27/32* (2006.01)
- *B32B 27/34* (2006.01)
- *B32B 27/36* (2006.01)

(52) U.S. Cl.
CPC ....... *B32B 2439/46* (2013.01); *B32B 2439/70* (2013.01); *Y10T 428/24331* (2015.01)

(56) References Cited

FOREIGN PATENT DOCUMENTS

| | | |
|---|---|---|
| JP | 2001-301844 | 10/2001 |
| JP | 2004-115053 | 4/2004 |
| JP | 2004-115056 | 4/2004 |
| JP | 2005-008260 | 1/2005 |
| JP | 2005-350102 | 12/2005 |
| JP | 2011-523923 | 8/2011 |
| WO | WO 2009/151901 A1 | 12/2009 |
| WO | WO 2012/086295 A1 | 6/2012 |

OTHER PUBLICATIONS

Machine Translation, JP 2004-115056, Takahagi et al., Apr. 15, 2004.*
International Search Report dated Dec. 17, 2013 in corresponding international application PCT/JP2013/077945.
Korean Office Action dated Jan. 11, 2017 in corresponding Korean Patent Application No. 10-2015-7008998.

* cited by examiner

LAMINATED FILM AND PACKAGING CONTAINER

CROSS REFERENCE TO RELATED APPLICATIONS

This application is a continuation application based on a PCT Patent Application No. PCT/JP2013/077945, filed Oct. 15, 2013, whose priority is claimed on Japanese Patent Application No. 2012-228075, filed Oct. 15, 2012, the entire content of which are hereby incorporated by reference.

BACKGROUND OF THE INVENTION

Field of the Invention

The present invention relates to a laminated film, and more particularly, to a laminated film that is used in a packaging container so that the contents can be appropriately heated in a microwave oven and a packaging bag using a laminated film.

Description of Related Art

There are various foods that are contained in a packaging container, such as a packaging bag, in a cooked or semi-cooked state so as to be able to be stored at room temperature, or at a low temperature, or in a frozen state and that can be eaten by being heated in a microwave oven without being opened.

When the packaging container is heated in the microwave without being opened, moisture in the packaging container becomes water vapor. Accordingly, the volume of the packaging container is increased. For this reason, there is a risk of rupture or the like of the packaging container if there is no gap through which water vapor can be discharged. On the other hand, when the contents are in a semi-cooked state or the like, it may be necessary to not only simply heat the contents but also steam the contents with the generated water vapor. In this case, if a hole or the like for discharging vapor is excessively large, steaming is not sufficiently performed. Accordingly, there is a problem, such as a reduction in the taste.

Some packaging bags corresponding to the above applications are known. All of these packaging bags are generally formed using a laminated film. When internal pressure increases, a crack is generated in a part of the laminated film, and water vapor is discharged through the crack. Thus, rupture is prevented.

As a packaging bag in which the contents can be steamed during the heating by a microwave, for example, a packaging bag disclosed in PCT International Publication No. WO2012/086295 is known. In the packaging bag, a slit passing through an outer layer and an inner layer is formed in a part of a laminated film having the outer layer and the inner layer and then the inner layer is heated and melted so that only the slit of the inner layer is closed. When heating the packaging bag in the microwave, the inner layer tears and a small hole is formed. Therefore, since water vapor is not excessively discharged, it is possible to perform steaming while preventing rupture.

However, although it is possible to perform steaming while preventing rupture in the packaging bag disclosed in PCT International Publication No. WO2012/086295, processing on the formation and re-fusing of the slit is complicated. Therefore, the manufacturing process is complicated, and it is difficult to improve the manufacturing efficiency. In addition, it is difficult to guarantee the sealing quality after re-fusing.

SUMMARY OF THE INVENTION

The invention has been made in view of the above situation, and it is an object of the invention to provide a laminated film that can be applied to a packaging container in order to prevent rupture during the heating by a microwave and that can be easily manufactured.

It is another object of the invention to provide a packaging container that can prevent rupture during the heating by a microwave and that can be easily manufactured.

According to a first aspect of the invention, there is provided a laminated film including: an inner layer which is formed of a heat-sealable thermoplastic resin; an outer layer which is laminated on the inner layer; and a fragile processed portion in which at least a part of the outer layer is removed and at least a part of the inner layer is present and which has a linear shape in planar view and a Young's modulus of 2.0 gigapascals or less.

According to a second aspect of the invention, there is provided a laminated film including: an inner layer which is formed of a linear low density polyethylene resin and is heat-sealable; an outer layer which is laminated on the inner layer; and a fragile processed portion in which at least a part of the outer layer is removed and at least a part of the inner layer is present and which has a linear shape in planar view and a Young's modulus less than 2.8 gigapascals.

A lamination strength under a heating environment near the fragile processed portion may be equal to or greater than 0.1 N/25 mm.

The fragile processed portion may be formed by laser irradiation.

In addition, the laminated film according to the first or second aspect of the invention may further include an intermediate layer which is provided between the inner layer and the outer layer.

In this case, the intermediate layer may be an ink layer for reducing a lamination strength between the inner layer and the outer layer and may be formed in a region excluding the fragile processed portion and a periphery of the fragile processed portion in planar view, or the intermediate layer may be a strong lamination layer increasing a lamination strength between the inner layer and the outer layer and may be formed in a region including both sides of the fragile processed portion in a longitudinal direction of the fragile processed portion in planar view.

According to a third aspect of the invention, there is provided a packaging container including the laminated film according to the first aspect of the invention, and a plurality of small holes are configured to be formed in the fragile processed portion during heating by a microwave.

By applying the laminated film according to the aspects of the invention to the packaging container, it is possible to prevent rupture during the heating by the microwave. In addition, the laminated film according to the aspect of the invention can be easily manufactured.

In addition, according to the packaging container according to the aspect of the invention, it is possible to prevent rupture during the heating by the microwave. In addition, the packaging container according to the aspect of the invention can be easily manufactured.

In addition, according to the laminated film or the packaging container according to the aspect of the invention, it is possible to perform steaming satisfactorily during the heating by the microwave by applying the laminated film to the packaging container.

DETAILED DESCRIPTION OF THE INVENTION

A laminated film and a packaging container according to a first embodiment of the invention will be described with reference to FIGS. 1 to 5B.

Figure 1:
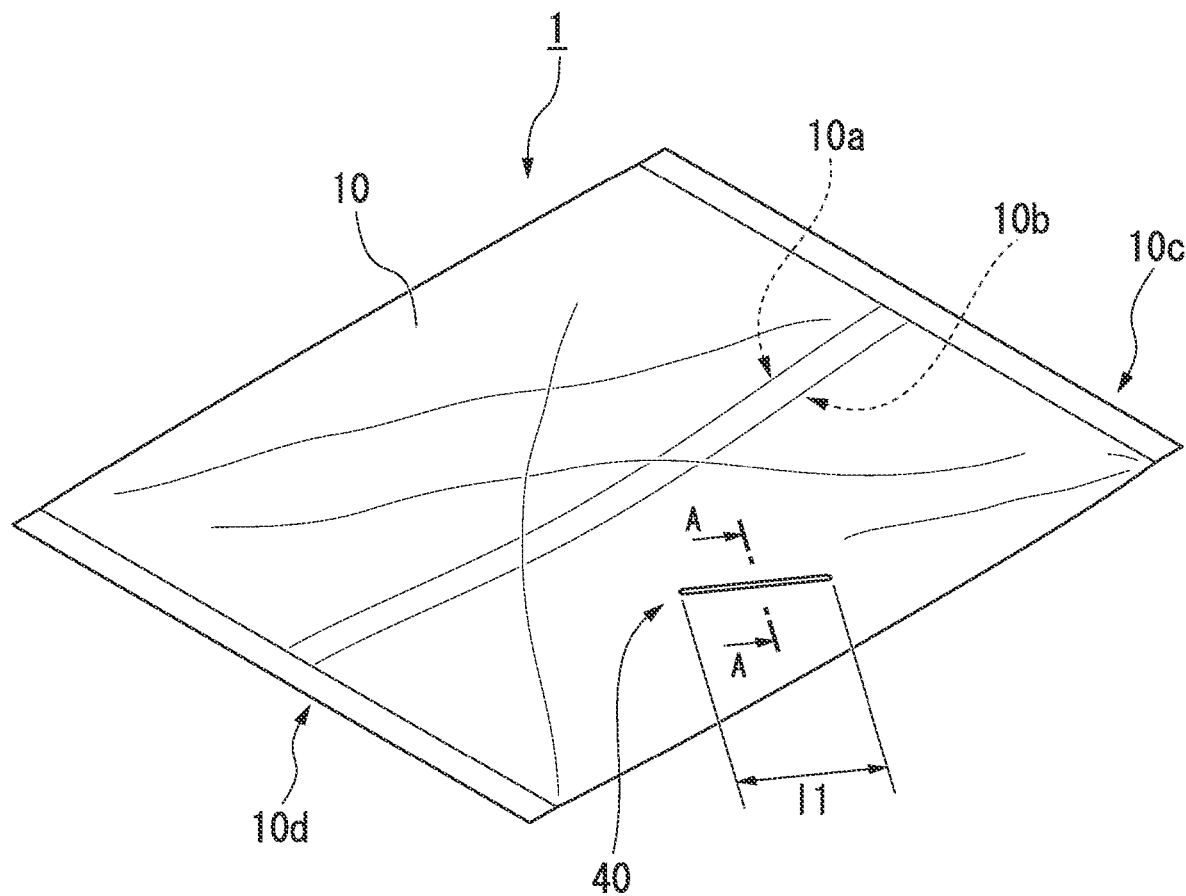
FIG. 1 is a perspective view showing a packaging bag formed by using a laminated film according to a first embodiment of the invention.

FIG. 1 is a perspective view showing a packaging bag (packaging container) 1 of the present embodiment. The packaging bag 1 is formed in a bag shape using a laminated film 10 having at least one surface that can be heat-sealed.

The packaging bag 1 of the present embodiment is formed in a bag shape by heat-sealing ends 10a and 10b of one rectangular or square laminated film 10 in an approximately cylindrical shape and then bonding both ends 10c and 10d in a direction in which the space of the cylindrical shape extends by heat-sealing.

In the packaging bag of the present embodiment, procedures and methods for forming the laminated film in a bag shape are not particularly limited. For example, a packaging bag may be formed by arranging two laminated films so as to face each other and bonding the peripheral portions by heat-sealing, or other methods may be used.

Figure 2:
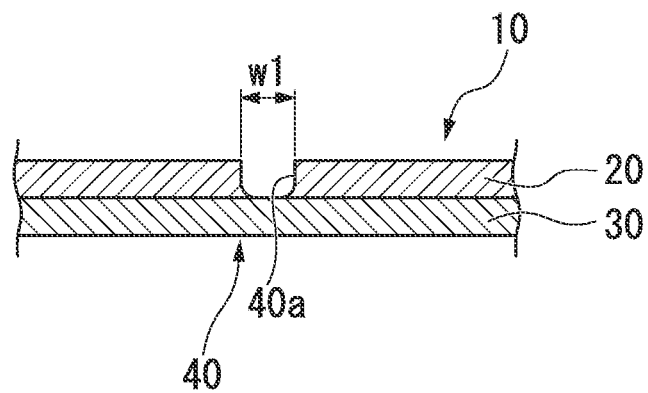
FIG. 2 is a cross-sectional view taken along the line A-A of FIG. 1.

FIG. 2 is a cross-sectional view of the laminated film 10 taken along the line A-A of FIG. 1. The laminated film 10 is formed by laminating an outer layer 20, which forms the outer surface of the packaging bag 1, and an inner layer 30, which forms the inner surface of the packaging bag 1 and which is heat-sealable. Both the outer layer 20 and the inner layer 30 are formed of a resin.

As a resin for forming the outer layer 20, a material having a relatively high rigidity is preferable in terms of protecting the contents. For example, polyethylene terephthalate (PET), biaxially oriented polypropylene (OPP), and biaxially oriented nylon (ONy) can be used. However, resin materials for forming the outer layer 20 are not limited thereto.

Secondary processing, such as printing or vapor deposition, may be performed on the outer layer 20 in order to improve the design or display various kinds of information. Such secondary processing may be performed on any of the front and back surfaces of the outer layer 20.

The inner layer 30 functions as a so-called sealant layer. Therefore, as a resin for forming the inner layer 30, it is possible to use a heat-sealable thermoplastic resin, for example, various known general-purpose polyolefines and special polyolefines. As specific examples, linear low density polyethylene (LLDPE), low density polyethylene (LDPE), medium density polyethylene (MDPE), high density polyethylene (HDPE), very low density polyethylene (VLDPE), unstretched polypropylene (CPP), ethylene vinyl acetate copolymer (EVA), ethylene acrylic acid copolymer (EAA), ethylene methacrylic acid copolymer (EMAA), ethylene ethyl acrylate copolymer (EEA), ethylene methyl methacrylate copolymer (EMMA), ethylene methyl acrylate copolymer (EMA), and ionomer (IO) can be used. However, resin materials for forming the inner layer 30 are not limited thereto.

When linear low density polyethylene (LLDPE) that is a heat-sealable thermoplastic resin is used as a resin for forming the inner layer 30, the impact fracture mass of the inner layer 30 is 100 g or more and 800 g or less, more preferably, 100 g or more and 700 g or less.

In the embodiment of the invention, the impact fracture mass is defined as a value measured according to JISK7124 "impact test method according to the dart method of free fall of plastic film and sheet".

The outer layer 20 and the inner layer 30 are bonded to each other by arranging an adhesive layer (not shown) therebetween and performing known dry lamination processing. The method of laminating the outer layer and the inner layer are not particularly limited. For example, as will be described later, the outer layer and the inner layer may be laminated using a sandwich lamination method in which another resin is interposed between the outer layer and the inner layer or a coextrusion method.

As shown in FIGS. 1 and 2, a fragile processed portion 40, which is formed by removing at least a part of the outer layer 20, is provided in a part of the outer surface of the packaging bag 1. In the fragile processed portion 40, the outer layer 20 is removed in a region having, for example, a width w1 of approximately 150 micrometers (μm) and a length 11 of 40 millimeters (mm), and a groove 40a is formed in the region. The fragile processed portion 40 in the present embodiment is a portion that is located in the groove 40a of the laminated film 10 and is thinner than other portions. In the fragile processed portion 40, the entire outer layer 20 is generally removed.

In the fragile processed portion 40, a Young's modulus (tensile elastic modulus) shown as a slope of the stressdistortion straight line per unit cross-sectional area is low compared with other portions of the laminated film 10 since the outer layer 20 has been removed. Accordingly, the fragile processed portion 40 tears easily. Specifically, the Young's modulus of the fragile processed portion 40 is equal to or less than 2.0 gigapascals (GPa) in the measurement conforming to JISK7127. In particular, when using the linear low density polyethylene (LLDPE) as a resin for forming the inner layer 30, the Young's modulus of the fragile processed portion 40 is less than 2.8 gigapascals (GPa) in the measurement conforming to JISK7127.

The lower limit of the Young's modulus of the fragile processed portion 40 is not particularly limited. When the Young's modulus of the fragile processed portion 40 is lower than the Young's modulus of the inner monolayer, the fragile processed portion may be broken by impact, such as dropping, which is not desirable.

Figure 3:
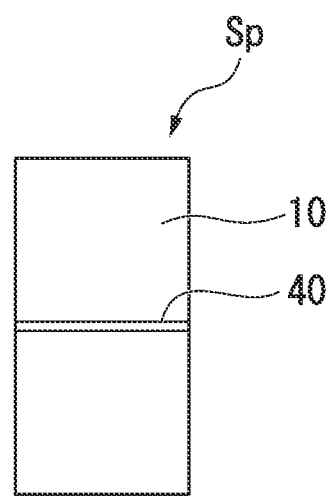
FIG. 3 is a schematic diagram showing a test piece when measuring the Young's modulus of a fragile processed portion.

In JISK7127, the size of the test piece is determined. Accordingly, it is difficult to measure the Young's modulus of only the fragile processed portion according to JISK7127. Therefore, in the invention, a Young's modulus measured according to JISK7127 using a test piece Sp shown in FIG. 3 is defined as the Young's modulus of the fragile processed portion. In the test piece Sp, the fragile processed portion 40 is formed in the middle of the laminated film 10, which is cut to the size set in JISK7127, in the longitudinal direction so as to extend in the width direction of the laminated film 10. In addition, the cross-sectional area used to calculate the Young's modulus of the fragile processed portion is calculated using the thickness of the fragile processed portion.

In the embodiment of the invention, the outer layer removal amount or processing depth in the fragile processed portion is not particularly limited as long as the Young's modulus satisfies the conditions described above. For example, a thin outer layer may remain over the entire surface of the fragile processed portion so that the inner layer is not exposed, or not only the outer layer but also a part of the inner layer may be removed. In this case, in order to prevent the leakage of the contents before heating the contents in the microwave, the fragile processed portion is formed so as not to pass through the inner layer. That is, at least a part of the outer layer may be removed and at least a part of the inner layer may remain so that the Young's modulus of the fragile processed portion satisfies the conditions described above.

For a position where the fragile processed portion 40 is formed, any portion such as the ends 10a to 10d, which is different from a portion heat-sealed to form the laminated film 10 in a bag shape, may be selected. The fragile processed portion 40 can be formed at any position in consideration of the type of the contents, a filling process, and the like.

In the diagrams, a case is shown in which the fragile processed portion is formed in one straight line shape. However, the shape of the fragile processed portion is not limited thereto. For example, the shape of the fragile processed portion may be a curved line shape or a zigzag line shape or two or more fragile processed portions may be formed as long as the conditions of the Young's modulus described above are satisfied. In addition, in the diagrams, a case is shown in which the fragile processed portion is a continuous line. However, the fragile processed portion may be formed in a broken line shape or the like as long as the conditions of the Young's modulus described above are satisfied.

As a method of forming the fragile processed portion 40, laser processing based on laser irradiation is preferable. If the laser processing is used, the shape and processing depth of the fragile processed portion can be adjusted relatively easily by adjusting the output and scanning speed of the laser head. Here, forming means is not limited to the laser processing, and it is also possible to use other methods.

The laminated film 10 having the fragile processed portion 40 formed at an arbitrary position is formed in an approximate bag shape with an open end, and the open end is heat-sealed after filling the contents through the open end. As a result, the packaging bag 1 filled with the contents is completed. When the packaging bag 1 of the present embodiment filled with the contents is put into the microwave and heated, moisture contained in the contents becomes water vapor. Accordingly, the packaging bag 1 expands, and the internal pressure of the packaging bag 1 is increased.

Figure 4:
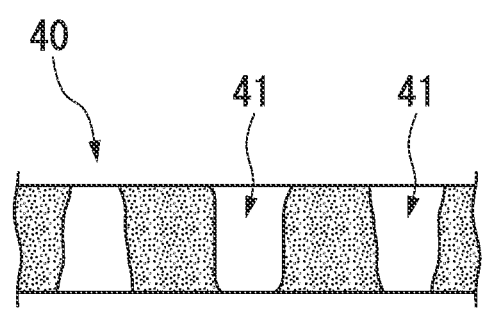
FIG. 4 is a diagram showing a fragile processed portion when heated in a microwave.

Due to the increase in internal pressure, a crack is generated in the fragile processed portion, and a hole passing through the laminated film in the thickness direction is formed. The inventors of the invention have found out that, if the Young's modulus of the fragile processed portion 40 defined as described above is set to be less than the predetermined value described above, the entire fragile processed portion 40 does not tear when the internal pressure of the packaging bag 1 is increased during the heating by the microwave and a plurality of small holes 41 spaced apart from each other are formed as shown in FIG. 4.

Basically, the fragile processed portion 40 is easily deformed in the longitudinal direction, but is difficult to deform in a direction perpendicular to the longitudinal direction because the fragile processed portion 40 is close to a portion bonded to the outer layer 20. It is thought that this is because the stress concentrates on some points spaced apart from each other in the fragile processed portion 40. It is thought that the reason why the crack does not spread so as to connect the formed small holes 41 to each other is that water vapor is discharged through the small holes 41 and accordingly the internal pressure is reduced.

In addition, the inventors have found out that, if the fragile processed portion 40 is formed by laser processing, a number of small holes 41 are formed at relatively short equal distances in the longitudinal direction of the fragile processed portion 40. Presumably, this is because a deep portion and a shallow portion are repeatedly formed in a groove by a periodic variation in the output of laser light when forming the fragile processed portion and the deep portion of the groove, that is, a thinner portion in the fragile processed portion tears early and accordingly a small hole is formed.

In addition, when the inner layer 30 is formed of LLDPE, the inner layer 30 can stand the internal pressure applied to the laminated film even after the small holes 41 are formed because the LLDPE extends easily due to its high flexibility and also has high impact strength. Therefore, it is possible to prevent the inner layer 30 from being broken due to small holes communicating with each other.

Since a plurality of small holes 41 are formed in the fragile processed portion 40, water vapor generated inside the packaging bag 1 is not discharged at once to the outside of the packaging bag 1, but continues to be discharged to such an extent as to prevent rupture in response to an increase in internal pressure. Thus, it is possible to cause no rupture or the like during the heating by the microwave and to appropriately perform steaming with water vapor remaining in the packaging bag 1.

As described above, according to the packaging bag 1 configured to include the laminated film 10 of the present embodiment, a plurality of small holes 41 are formed in the fragile processed portion 40 during the heating by the microwave. Therefore, it is possible to appropriately perform steaming by keeping a portion of water vapor in the packaging bag while appropriately preventing rupture or the like due to the increase in internal pressure.

If the fragile processed portion 40 is provided, processes such as re-fusing after cutting the inner layer with a slit is not required. For this reason, it is possible to simplify the process of manufacturing the laminated film 10. Therefore, it is possible to easily manufacture the packaging bag 1.

In addition, since the fragile processed portion 40 can be formed anywhere on the laminated film except for the ends where the inner layer 30 is heat-sealed, the degree of freedom in the packaging bag design is high. Accordingly, even when manufacturing a plurality of types of packaging bags in which the position of the fragile processed portion differs depending on the type of contents or the like, it is possible to easily correspond to the situation, for example, by changing the laser radiation position.

In the present embodiment, each of the outer layer and the inner layer may not necessarily be a single layer. In a laminated film 1 0A in a modification example shown in FIG. 5A, an outer layer 20A has a first layer 21 formed of a first resin and a second layer 22 formed of a second resin that is different from the first resin.

Figure 5A:
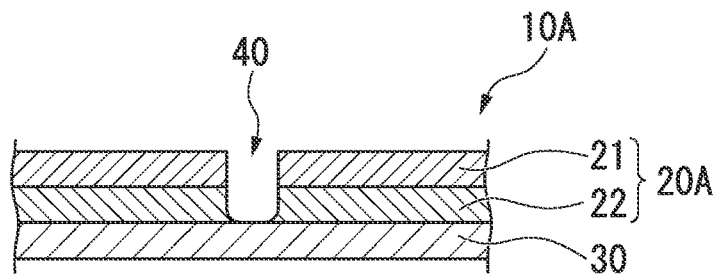
FIG. 5A is a cross-sectional view in a modification example of the laminated film.
Figure 5B:
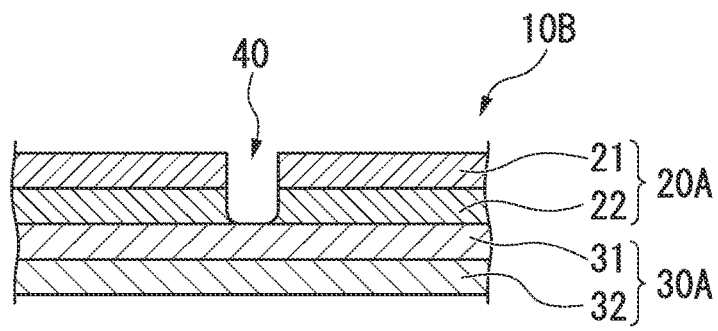
FIG. 5B is a cross-sectional view in a modification example of the laminated film.

In a laminated film 10B in a modification example shown in FIG. 5B, an inner layer 30A bonded to the outer layer 20A has an upper layer 31 formed of a third resin and a lower layer 32 formed of a fourth resin that is different from the third resin. For example, when LLDPE is used as the inner layer 30A, it is preferable that the inner layer 30A has the upper layer 31 formed of LLDPE and the lower layer 32 formed of LLDPE having different physical properties from the upper layer 31. In the configuration shown in FIG. 5B, the laminated film 10B can be formed without using an adhesive layer by bonding the outer layer 20A and the lower layer 32 to each other with a third resin using a sandwich lamination method.

In addition, the number of layers and the configuration of layers are not limited as long as the fragile processed portion can be formed. For example, it is possible to form an inner layer having two layers and an outer layer having a single layer, or it is possible to form an inner layer having three or more layers and an outer layer having three or more layers.

In the embodiment of the invention, it is preferable that the lamination strength under the heating environment near the fragile processed portion is equal to or greater than 0.1 N/25 mm. If the lamination strength under the heating environment is equal to or greater than 0.1 N/25 mm, even when the internal volume of the packaging material expands during microwave heating, stress due to volume expansion is limited to the inner layer of the fragile processed region because the outer layer and the inner layer are bonded to each other in a region other than the fragile processed portion. Therefore, since the inner layer of the region is efficiently extended and breakage occurs locally, a vapor discharge hole can be made to appear only in the fragile processed region.

On the other hand, if the lamination strength under the heating environment is less than 0.1 N/25 mm, when the internal volume of the packaging material expands during microwave heating, the outer layer and the inner layer are peeled off from each other due to the stress by which the inner layer is extended. Accordingly, the inner layer extends endlessly as a single layer. If the internal volume is excessively increased, the strength of the inner layer is reduced, and breakage occurs from the unspecified location.

A laminated film and a packaging bag according to a second embodiment of the invention will be described with reference to FIGS. 6A to 7C. A laminated film 51 of the present embodiment and the laminated film 10 that forms the packaging bag 1 of the first embodiment are different in that an intermediate layer is provided between the outer layer and the inner layer in the second embodiment. In the following explanation, the same components as those already described are denoted by the same reference numerals, and repeated explanation thereof will be omitted.

Also in the present embodiment, the Young's modulus of the fragile processed portion 40 is equal to or less than 2.0 gigapascals (GPa) in the measurement conforming to JISK7127. Also in the present embodiment, in particular, when using the linear low density polyethylene (LLDPE) as a resin for forming the inner layer 30, the Young's modulus of the fragile processed portion 40 is less than 2.8 gigapascals (GPa) in the measurement conforming to JISK7127. In addition, also in the embodiment of the invention, it is preferable that the lamination strength under the heating environment near the fragile processed portion is equal to or greater than 0.1 N/25 mm.

Figure 6A:
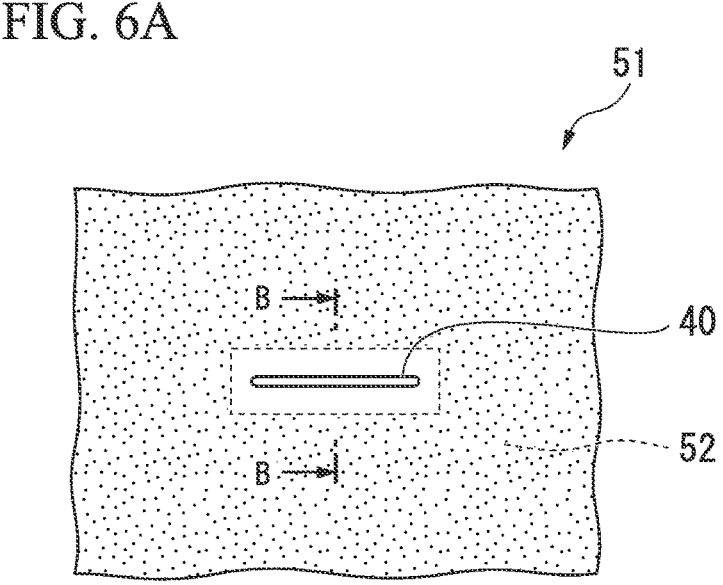
FIG. 6A is a partial plan view of a laminated film according to a second embodiment of the invention.
Figure 6B:
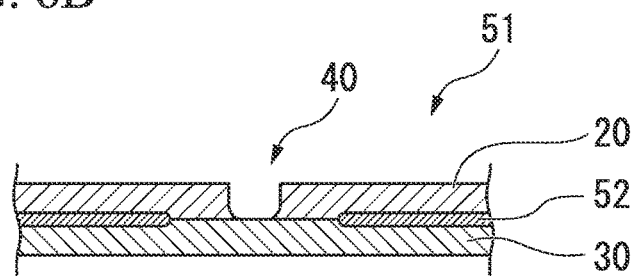
FIG. 6B is a cross-sectional view taken along the line B-B of FIG. 6A.

FIG. 6A is a partial plan view of the laminated film 51 of the present embodiment, and FIG. 6B is a cross-sectional view taken along the line B-B of FIG. 6A. As shown in FIG. 6B, in the laminated film 51, an ink layer (intermediate layer) 52 is formed between the outer layer 20 and the inner layer 30.

The ink layer 52 is provided in order to improve the design of the packaging container or to provide functions, such as various kinds of display regarding products, and can be formed using various kinds of known inks.

Generally, the lamination strength between the outer layer 20 and the inner layer 30 is reduced by interposing the ink layer 52. If the lamination strength of the fragile processed portion 40 and the lamination strength around the fragile processed portion 40 are reduced, small holes may not be formed well at the time of heating. In order to prevent this, in the present embodiment, as shown in FIG. 6A, the ink layer 52 is not formed in the fragile processed portion and around the fragile processed portion. A range where the ink layer 52 is not formed around the fragile processed portion 40 can be appropriately set. For example, it is possible to set a rectangular range including positions away from both sides of the fragile processed portion 40 in the longitudinal direction by 5 mm and positions away from both sides of the fragile processed portion 40 in the width direction by 2.5 mm.

Figure 7A:
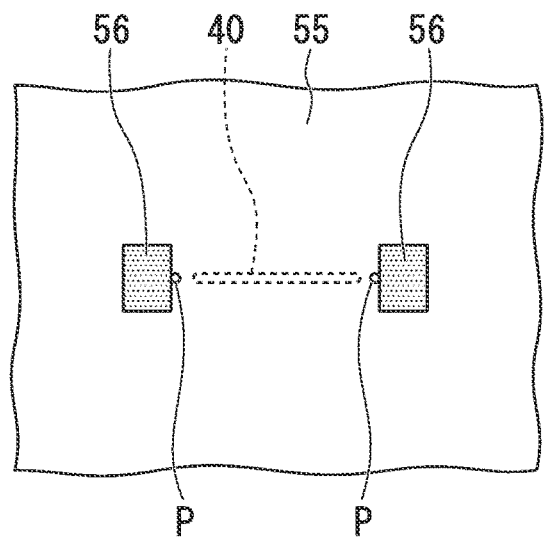
FIG. 7A is a plan view showing an inner layer in a modification example of the laminated film.
Figure 7B:
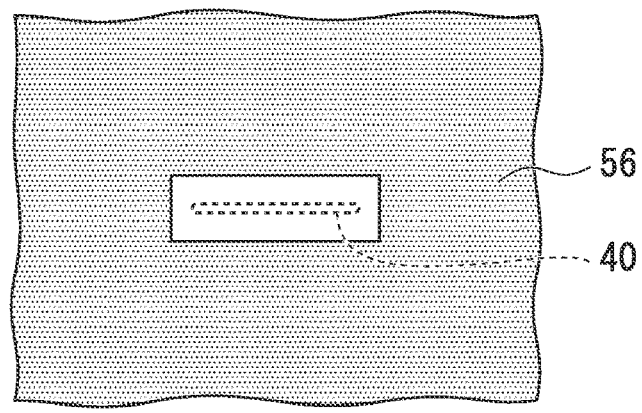
FIG. 7B is a plan view showing an inner layer in a modification example of the laminated film.
Figure 7C:
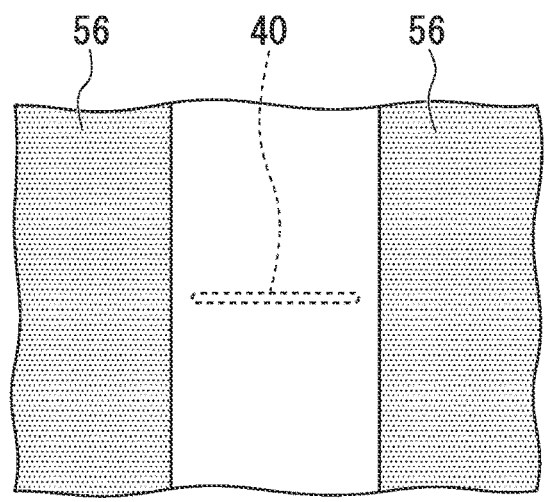
FIG. 7C is a plan view showing an inner layer in a modification example of the laminated film.
Figure 8A:
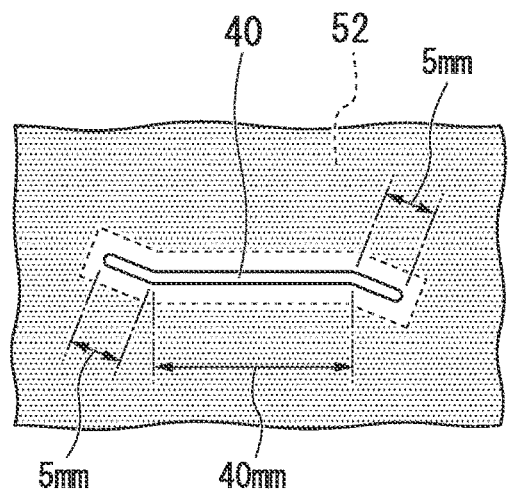
FIG. 8A is a plan view showing a fragile processed portion of the laminated film according to the embodiment of the invention.
Figure 8B:
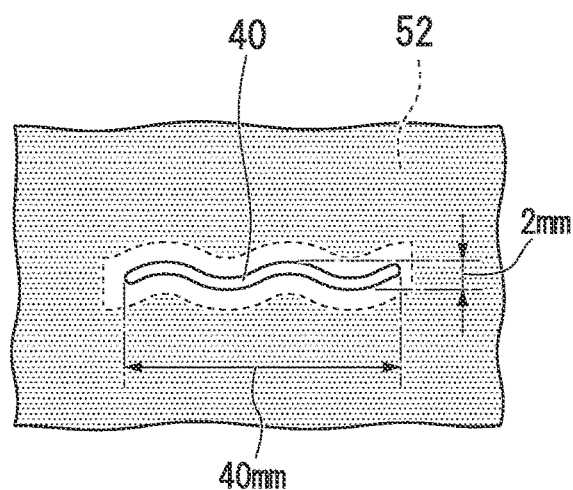
FIG. 8B is a plan view showing a fragile processed portion of the laminated film according to the embodiment of the invention.
Figure 8C:
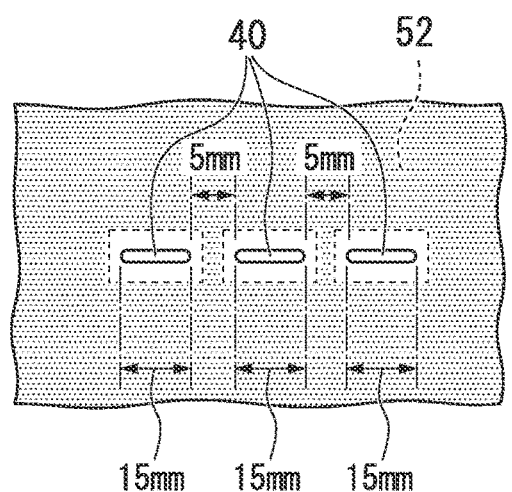
FIG. 8C is a plan view showing a fragile processed portion of the laminated film according to the embodiment of the invention.
Figure 8D:
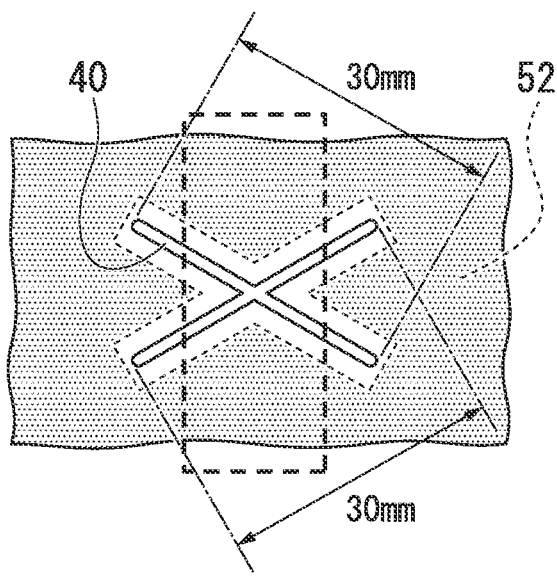
FIG. 8D is a plan view showing a fragile processed portion of the laminated film according to the embodiment of the invention.
Figure 8E:
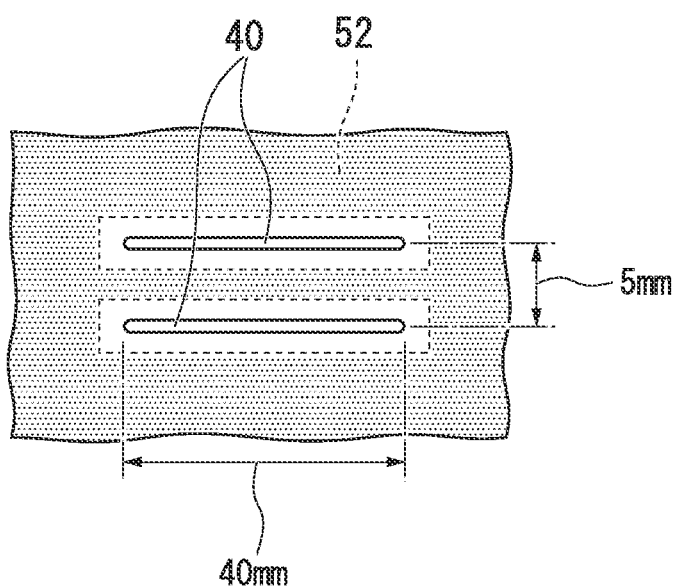
FIG. 8E is a plan view showing a fragile processed portion of the laminated film according to the embodiment of the invention.

When the lamination strength between the outer layer and the inner layer is not high due to compatibility of materials, it is possible to improve the lamination strength by providing an intermediate layer. FIGS. 7A to 7C shows modification examples for increasing the lamination strength between the outer layer and the inner layer.

FIGS. 7A to 7C are partial plan views when the outer layer is removed from the laminated film in all of the modification examples. On a surface of the inner layer 55 bonded to the outer layer, a strong lamination layer 56 is formed by applying a medium. In addition, the lamination strength between the outer layer and the inner layer in a portion where the strong lamination layer 56 is formed is more improved than that in other portions. As shown in FIG. 7A, when the strong lamination layer 56 is formed on both sides of the fragile processed portion 40 in the longitudinal direction (shown by the dotted line since the fragile processed portion is mainly formed in the outer layer), stress applied to the fragile processed portion 40 becomes uneven due to the strong lamination layer 56, and the small hole 41 is formed in a portion P where the extension line of the fragile processed portion 40 and the strong lamination layer 56 cross each other.

Accordingly, the strong lamination layer (intermediate layer) 56 in this modification example is preferably formed on at least both sides of the fragile processed portion 40 in the longitudinal direction. As long as this condition is satisfied, the strong lamination layer (intermediate layer) 56 may be formed in the entire periphery of the fragile processed portion 40 as shown in FIG. 7B, or the strong lamination layer (intermediate layer) 56 may be formed so as to entirely cover both sides of the fragile processed portion 40 in the longitudinal direction as shown in FIG. 7C. In addition, although not shown, the strong lamination layer may be formed on the entire surface of the laminated film.

Also in the laminated film 51 of the present embodiment, similar to the laminated film 10 of the first embodiment, it is possible to appropriately perform steaming while appropriately preventing rupture or the like due to the increase in internal pressure while being heated by the microwave.

In addition, since the intermediate layer is provided between the outer layer and the inner layer, even if various materials are used for the outer layer and the inner layer, it is possible to appropriately form small holes in the fragile processed portion while being heated by appropriately adjusting the lamination strength of the fragile processed portion and the lamination strength around the fragile processed portion.

In addition, granting the design for the packaging bag formed by the laminated film or displaying product information or the like can be easily performed by forming the intermediate layer as an ink layer.

Subsequently, the invention will be further described with reference to examples.

EXAMPLE 1 Group

In Example 1 group, each of the outer layer and the inner layer is formed as a single layer.

EXAMPLE 1-1

A PET film having a thickness of 12 μm was used as an outer layer, and an LLDPE film (Young's modulus of 0.15 GPa: measured according to JISK7127, the same hereinbelow) having a thickness of 30 μm was used as an inner layer. The outer layer and the inner layer were bonded to each other by dry lamination using an aliphatic ester based adhesive for dry lamination, and a fragile processed portion having a depth approximately passing through the outer layer was formed in a width of 150 μm and a length of 40 mm by laser irradiation, thereby manufacturing a laminated film of Example 1-1.

In the laminated film of Example 1-1, the Young's modulus of the fragile processed portion measured by the above-described method was 1.6 GPa, and the lamination strength (measured according to JISK6854) between the outer layer and the inner layer was 8 N/25 mm.

This was formed in a bag shape using the above-described method, thereby manufacturing the packaging bag of the present example. Since the packaging bag was formed in an approximately rectangular parallelepiped shape, a surface including a bonding portion between the end 10a and the end 10b was set as a bottom surface, the opposite surface was set as a top surface, and a surface between the top and bottom surfaces was set as a side surface. The packaging bag of Example 1-1 was formed such that the fragile processed portion was located on the top surface.

EXAMPLE 1-2

The same laminated film as in Example 1-1 was used as a laminated film. The packaging bag of Example 1-2 was formed such that the fragile processed portion was located on the side surface.

EXAMPLE 1-3

The same laminated film as in Example 1-1 was used as a laminated film. The packaging bag of Example 1-2 was formed such that the fragile processed portion was located on the bottom surface.

EXAMPLE 1-4

Materials of the outer layer and the inner layer were the same as those in Example 1-1. The fragile processed portion was formed in a broken line shape by laser irradiation. A dotted line was formed by repeatedly forming a groove having a length of 1 mm 30 times with a distance of 0.1 mm therebetween. The Young's modulus of the fragile processed portion was 1.6 GPa.

The packaging bag of Example 1-4 was formed such that the fragile processed portion was located on the top surface.

EXAMPLE 1-5

Except that an LLDPE film (Young's modulus of 0.15 GPa) having a thickness of 40 μm was used as an inner layer, the laminated film and the packaging bag were manufactured in the same procedure as in Example 1-1. The Young's modulus of the fragile processed portion was 1.7 GPa, and the lamination strength between the outer layer and the inner layer was 8 N/25 mm.

EXAMPLE 1-6

Except that an LLDPE film (Young's modulus of 0.12 GPa) having a thickness of 30 μm was used as an inner layer, the laminated film and the packaging bag were manufactured in the same procedure as in Example 1-1. The Young's modulus of the fragile processed portion was 1.6 GPa, and the lamination strength between the outer layer and the inner layer was 8 N/25 mm.

EXAMPLE 1-7

Except that an LLDPE film (Young's modulus of 0.05 GPa) having a thickness of 30 μm was used as an inner layer, the laminated film and the packaging bag were manufactured in the same procedure as in Example 1-1. The Young's modulus of the fragile processed portion was 1.0 GPa, and the lamination strength between the outer layer and the inner layer was 8 N/25 mm.

EXAMPLE 1-8

Except that an EVA film (Young's modulus of 0.16 GPa) having a thickness of 30 μm was used as an inner layer, the laminated film and the packaging bag were manufactured in the same procedure as in Example 1-1. The Young's modulus of the fragile processed portion was 1.7 GPa, and the lamination strength between the outer layer and the inner layer was 8 N/25 mm.

EXAMPLE 1-9

Except that an LDPE film (Young's modulus of 0.3 GPa) having a thickness of 30 μm was used as an inner layer, the laminated film and the packaging bag were manufactured in the same procedure as in Example 1-1. The Young's modulus of the fragile processed portion was 2.0 GPa, and the lamination strength between the outer layer and the inner layer was 8 N/25 mm.

COMPARATIVE EXAMPLE 1-A

Except that a CPP film (Young's modulus of 0.7 GPa) having a thickness of 30 μm was used as an inner layer, the laminated film and the packaging bag were manufactured in the same procedure as in Example 1-1. The Young's modulus of the fragile processed portion was 2.2 GPa, and the lamination strength between the outer layer and the inner layer was 8 N/25 mm.

COMPARATIVE EXAMPLE 1-B

Except that a CPP film (Young's modulus of 0.8 GPa) having a thickness of 30 μm was used as an inner layer, the laminated film and the packaging bag were manufactured in the same procedure as in Example 1-1. The Young's modulus of the fragile processed portion was 2.5 GPa, and the lamination strength between the outer layer and the inner layer was 8 N/25 mm.

For the packaging bags of the examples and the comparative examples described above, a heating experiment using a microwave was performed according to the following procedure.

At the time of packaging bag formation, a cloth that was frozen in a state containing 50-cc water was disposed as contents in a packaging bag, and then the ends of the packaging bag was closed for sealing. The packaging bag containing the contents was heated for two minutes at 600 watts output using a microwave, and the occurrence of rupture and the state of steaming were observed. The rupture was defined as either a state where a portion other than a fragile processed portion in a packaging bag tore or a state where the fragile processed portion tore but a crack extended to a portion other than the fragile processed portion. For the steaming, "steam holes having a diameter of mm unit or 1 mm or less were formed in the fragile processed portion during heating and the expanded state was held satisfactorily" was set as excellent, "steam holes having a diameter of cm unit were formed in the fragile processed portion during heating and the expanded state was held to some extent" was set as passing, and "portions other than the fragile processed portion tore or the fragile processed portion tore but the crack extended to a portion other than the fragile processed portion and accordingly it was not possible to hold the expanded state" was set as failing. Table 1 shows the results of Examples 1-1 to 1-8 and Comparative examples 1-A to 1-C.

TABLE 1

| | Inner layer | | | Fragile processed portion | | Fragile processed portion | | Microwave heating | | |
|---|---|---|---|---|---|---|---|---|---|---|
| | Material | Thickness | Young's modulus (Gpa) | Young's modulus (Gpa) | Lamination strength | Shape | Position | Rupture | Steaming | State |
| Example 1-1 | LLDPE | 30 | 0.15 | 1.6 | 8N | Continuous line | Top surface | None | Excellent | Plurality of small holes in processed portion |
| Example 1-2 | LLDPE | 30 | 0.15 | 1.6 | 8N | Continuous line | Side surface | None | Excellent | Plurality of small holes in processed portion |
| Example 1-3 | LLDPE | 30 | 0.15 | 1.6 | 8N | Continuous line | Bottom surface | None | Excellent | Plurality of small holes in processed portion |
| Example 1-4 | LLDPE | 30 | 0.15 | 1.6 | 8N | Broken line | Top surface | None | Excellent | Plurality of small holes in processed portion |
| Example 1-5 | LLDPE | 40 | 0.15 | 1.7 | 8N | Continuous line | Top surface | None | Excellent | Plurality of small holes in processed portion |
| Example 1-6 | LLDPE | 30 | 0.12 | 1.6 | 8N | Continuous line | Top surface | None | Excellent | Plurality of small holes in processed portion |
| Example 1-7 | LLDPE | 30 | 0.16 | 1.7 | 8N | Continuous line | Top surface | None | Excellent | Plurality of small holes in processed portion |
| Example 1-8 | EVA | 30 | 0.05 | 1.0 | 8N | Continuous line | Top surface | None | Excellent | Plurality of small holes in processed portion |
| Example 1-9 | LDPE | 30 | 0.3 | 2.0 | 8N | Continuous line | Top surface | None | Passing | Processed portion was largely opened |
| Comparative example 1-A | CPP | 30 | 0.7 | 2.2 | 8N | Continuous line | Top surface | Occurred | Failing | Torn from processed portion |
| Comparative example 1-B | CPP | 30 | 0.8 | 2.5 | 8N | Continuous line | Top surface | Occurred | Failing | Sealed portion was torn |

As shown in Table 1, in Examples 1-1 to 1-8 in which the Young's modulus of the fragile processed portion was set to 2.0 GPa or less, a plurality of small holes were formed in the fragile processed portion during heating, and vapor was discharged to the outside of the packaging bag without causing rupture. In addition, since the expanded state of the packaging bag was held, it was possible to perform steaming. Also in Example 1-9, since a large crack was formed over the entire fragile processed portion, it was possible to suppress the rupture.

In contrast, in Comparative examples 1-A and 1-B, rupture was started from the fragile processed portion and the heat-sealed end of the laminated film.

EXAMPLE 2 Group

Example 2 group is examples in which at least one of the outer layer and the inner layer is formed so as to have a plurality of layers.

EXAMPLE 2-1

A PET film having a thickness of 12 μm and an ONy film having a thickness of 15 μm were used as an outer layer, and an LLDPE film (Young's modulus of 0.15 GPa) having a thickness of 40 μm was used as an inner layer.

The PET film and the ONy film and the outer layer and the inner layer were bonded to each other by dry lamination using an aliphatic ester based adhesive for dry lamination, and a fragile processed portion having a depth approximately passing through the outer layer was formed in a width of 150 μm and a length of 40 mm by laser irradiation, thereby manufacturing a laminated film of Example 2-1. In the laminated film of Example 2-1, the Young's modulus of the fragile processed portion was 1.6 GPa, and the lamination strength between the outer layer and the inner layer was 8 N/25 mm.

The laminated film of Example 2-1 was formed in a bag shape using the same method as in Example 1-1, thereby manufacturing the packaging bag of the present example.

EXAMPLE 2-2

The configuration of the outer layer was the same as that in Example 2-1, and an LLDPE film having a thickness of 40 μm was prepared as an inner layer.

The films of the outer layer were bonded to each other by dry lamination, and then the outer layer and the inner layer were bonded to each other by performing sandwich lamination using the LDPE as a sand layer. Thus, a laminated film (the Young's modulus of the inner layer was 0.15 GPa) of Example 2-2 having a two-layer configuration in which the inner layer included the LDPE (13 μm in thickness) and the LLDPE was manufactured. In the laminated film of Example 2-2, the Young's modulus of the fragile processed portion was 1.6 GPa, and the lamination strength between the outer layer and the inner layer was 8 N/25 mm.

The laminated film of Example 2-1 was formed in a bag shape using the same method as in Example 1-1, thereby manufacturing the packaging bag of the present example.

COMPARATIVE EXAMPLE 2-A

Except that the depth of the fragile processed portion was set to a depth approximately passing through only the PET film, the laminated film of Comparative example 2-A was manufactured in the same procedure as in Example 2-1. In the laminated film of Comparative example 2-A, the Young's modulus of the fragile processed portion was 3.5 GPa, and the lamination strength between the outer layer and the inner layer was 8 N/25 mm.

The laminated film of Comparative example 2-A was formed in a bag shape using the same method as in Example 1-1, thereby manufacturing the packaging bag of the present comparative example.

COMPARATIVE EXAMPLE 2-B

Except that the depth of the fragile processed portion was set to a depth reaching an intermediate portion of the ONy film in the thickness direction, the laminated film of Comparative Example 2B was manufactured in the same procedure as in Example 1-1. In the laminated film of Comparative example 2-B, the Young's modulus of the fragile processed portion was 3.1 GPa, and the lamination strength between the outer layer and the inner layer was 8 N/25 mm.

The laminated film of Comparative example 2-B was formed in a bag shape using the same method as in Example 1-1, thereby manufacturing the packaging bag of the present comparative example.

Table 2 shows the results of heating experiments using a microwave that were performed under the same conditions as in Example 1 group for the packaging bags of Examples 2-1 to 2-2 and Comparative examples 2-A and 2-B.

TABLE 2

| | Lamination method | Fragile processed portion | | | Young's modulus of inner layer | Young's modulus of fragile processed portion | Lamination strength | Microwave heating | | |
|---|---|---|---|---|---|---|---|---|---|---|
| | | Depth | Shape | Position | | | | Rupture | Steaming | State |
| Example 2-1 | Dry lamination | Passing through outer layer | Continuous line | Top surface | 0.15 | 1.6 | 8N | None | Excellent | Plurality of small holes in processed portion |
| Example 2-2 | Sandwich lamination | Passing through outer layer | Continuous line | Top surface | 0.15 | 1.6 | 8N | None | Excellent | Plurality of small holes in processed portion |
| Comparative example 2-A | Dry lamination | Depth reaching between layers of PET | Continuous line | Top surface | 0.15 | 3.5 | 8N | Occurred | Failing | Sealed portion was torn |

TABLE 2-continued

| | Lamination method | Fragile processed portion | | | Young's modulus of inner layer | Young's modulus of fragile processed portion | Lamination strength | Microwave heating | | |
| --- | --- | --- | --- | --- | --- | --- | --- | --- | --- | --- |
| | | Depth | Shape | Position | | | | Rupture | Steaming | State |
| Comparative example 2-B | Dry lamination | Depth reaching between layers of ONy | Continuous line | Top surface | 0.15 | 3.1 | 8N | Occurred | Failing | Sealed portion was torn |

As shown in Table 2, in Examples 2-1 to 2-2 in which the Young's modulus of the fragile processed portion was set to 2.0 GPa or less, a plurality of small holes were formed in the fragile processed portion during heating, and vapor was discharged to the outside of the packaging bag without causing rupture. In addition, since the expanded state of the packaging bag was held, it was possible to perform steaming.

In contrast, in Comparative examples, rupture was started from the heat-sealed end of the laminated film.

EXAMPLE 3 Group

Example 3 group is examples in which an ink layer for reducing the lamination strength is provided as an intermediate layer.

EXAMPLE 3-1

A PET film having a thickness of 12 μm was used as an outer layer, and an LLDPE film (Young's modulus of 0.15 GPa) having a thickness of 30 μm was used as an inner layer. An ink layer was formed on one surface of the PET film except for a rectangular region of 50 mm×5 mm by printing using white ink. Then, the surface of the outer layer on which the ink layer was provided and the inner layer were bonded to each other by dry lamination using an aliphatic ester based adhesive for dry lamination. Then, a fragile processed portion having a depth approximately passing through the outer layer was formed in a width of 150 μm and a length of 40 mm so as to be located in a region where no ink layer was formed in planar view, thereby manufacturing the laminated film of Example 3-1. In the laminated film of Example 3-1, the Young's modulus of the fragile processed portion was 1.6 GPa, and the lamination strength between the outer layer and the inner layer was 8 N/25 mm.

The laminated film of Example 3-1 was formed in a bag shape using the same method as in Example 1-1, thereby manufacturing the packaging bag of the present example.

EXAMPLE 3-2

Except that an LLDPE film (Young's modulus of 0.15 GPa) having a thickness of 40 μm was used as an inner layer, the laminated film and the packaging bag were manufactured in the same procedure as in Example 3-1. The Young's modulus of the fragile processed portion was 1.6 GPa, and the lamination strength between the outer layer and the inner layer was 8 N/25 mm.

EXAMPLE 3-3

Except that the shape of the fragile processed portion was the same as that in Example 1-4, the laminated film and the packaging bag were manufactured in the same procedure as in Example 3-1. The Young's modulus of the fragile processed portion was 1.6 GPa, and the lamination strength between the outer layer and the inner layer was 8 N/25 mm.

EXAMPLE 3-4

Except that the ink layer was formed on one entire surface of the PET film, the laminated film and the packaging bag were manufactured in the same procedure as in Example 3-1. The Young's modulus of the fragile processed portion was 1.6 GPa, and the lamination strength between the outer layer and the inner layer was 1.8 N/25 mm.

Table 3 shows the results of heating experiments using a microwave that were performed under the same conditions as in Example 1 group for the packaging bags of Examples 3-1 to 3-4.

TABLE 3

| | Inner layer | | Fragile processed portion | | Young's modulus of inner layer | Young's modulus of fragile processed portion | Lamination strength of processed portion | Microwave heating | | |
| --- | --- | --- | --- | --- | --- | --- | --- | --- | --- | --- |
| | Material | Thickness | Shape | Ink lamination pattern | | | | Rupture | Steaming | State |
| Example 3-1 | LLDPE | 30 | Continuous line | Window around fragile processed portion is excluded | 0.15 | 1.6 | 8N | None | Excellent | Plurality of small holes in processed portion |
| Example 3-2 | LLDPE | 40 | Continuous line | Window around fragile processed portion is excluded | 0.15 | 1.6 | 8N | None | Excellent | Plurality of small holes in processed portion |
| Example 3-3 | LLDPE | 30 | Broken line | Window around fragile processed portion is excluded | 0.15 | 1.6 | 8N | None | Excellent | Plurality of small holes in processed portion |

TABLE 3-continued

| | Inner layer | | Fragile processed portion | | Young's modulus of inner layer | Young's modulus of fragile processed portion | Lamination strength of processed portion | Microwave heating | | |
|---|---|---|---|---|---|---|---|---|---|---|
| | Material | Thickness | Shape | Ink lamination pattern | | | | Rupture | Steaming | State |
| Example 3-4 | LLDPE | 30 | Continuous line | Entire surface coated | 0.15 | 1.6 | 2.5 to 3N | None | Excellent | Vapor was ejected since the number of small holes was small |

As shown in Table 3, in Examples 3-1 to 3-3 in which the Young's modulus of the fragile processed portion was set to 2.0 GPa or less and no ink layer was formed around the fragile processed portion, a plurality of small holes were formed in the fragile processed portion during heating, and vapor was discharged to the outside of the packaging bag without causing rupture. In addition, since the expanded state of the packaging bag was held, it was possible to perform steaming.

On the other hand, although it was also possible to perform steaming while suppressing the rupture in the example 3-4, a phenomenon that vapor was ejected from the packaging bag was observed since the number of small holes formed in the fragile processed portion was smaller than that in the other examples. Accordingly, when providing the ink layer, it was preferable to avoid the periphery of the fragile processed portion.

EXAMPLE 4 Group

Example 4 group is examples in which a strong lamination layer for increasing the lamination strength is provided as an intermediate layer.

EXAMPLE 4-1

A PET film having a thickness of 12 μm was used as an outer layer, and an LLDPE film (Young's modulus of 0.16 GPa) having a thickness of 40 μm was used as an inner layer. In addition, a medium coat layer (strong lamination layer) of 10 mm×5 mm was formed on both sides of a region for forming the fragile processed portion in the longitudinal direction, on one surface of the outer layer, by printing. The surface of the outer layer on which the medium coat layer was provided and the inner layer were bonded to each other by dry lamination using an aliphatic ester based adhesive for dry lamination. Then, a fragile processed portion having a depth approximately passing through the outer layer was formed in a width of 150 μm and a length of 40 mm so as to be located between two medium coat layers in planar view, thereby manufacturing the laminated film of Example 4-1. In the laminated film of Example 4-1, the Young's modulus of the fragile processed portion was 1.6 GPa, and the lamination strength between the outer layer and the inner layer in the medium coat layer was 5 N/25 mm.

The laminated film of Example 4-1 was formed in a bag shape using the same method as in Example 1-1, thereby manufacturing the packaging bag of the present example.

EXAMPLE 4-2

Except that the medium coat layer was formed on the entire surface of the PET film (outer layer) excluding a non-formation region of 50 mm×5 mm and the fragile processed portion was formed so as to be located in the non-formation region in planar view, the laminated film and the packaging bag were manufactured in the same procedure as in Example 4-1. The Young's modulus of the fragile processed portion was 1.6 GPa, and the lamination strength between the outer layer and the inner layer in the medium coat layer was 5 N/25 mm.

EXAMPLE 4-3

Except that the medium coat layer was formed on the entire surface of the PET film excluding a non-formation region, which is formed with a width of 50 mm from one end to the other end in the width direction of the PET film, and the fragile processed portion was formed so as to be located in the non-formation region in planar view, the laminated film and the packaging bag were manufactured in the same procedure as in Example 4-1. The Young's modulus of the fragile processed portion was 1.6 GPa, and the lamination strength between the outer layer and the inner layer in the medium coat layer was 5 N/25 mm.

EXAMPLE 4-4

Except that the shape of the fragile processed portion was the same as that in Example 1-4, the laminated film and the packaging bag were manufactured in the same procedure as in Example 4-1. The Young's modulus of the fragile processed portion was 1.6 GPa, and the lamination strength between the outer layer and the inner layer in the medium coat layer was 5 N/25 mm.

EXAMPLE 4-5

Except that no medium coat layer was provided, the laminated film and the packaging bag were manufactured in the same procedure as in Example 4-1. The Young's modulus of the fragile processed portion was 1.6 GPa, and the lamination strength between the outer layer and the inner layer was 2 N/25 mm.

Table 4 shows the results of heating experiments using a microwave that were performed under the same conditions as in Example 1 group for the packaging bags of Examples 4-1 to 4-5.

TABLE 4

| | Inner layer | | Fragile processed portion | | Young's modulus of inner layer | Young's modulus of fragile processed portion | Lamination strength of processed portion | Microwave heating | | |
|---|---|---|---|---|---|---|---|---|---|---|
| | Material | Thickness | Shape | Medium coat layer | | | | Rupture | Steaming | State |
| Example 4-1 | LLDPE | 40 | Continuous line | Both sides of processed portion | 0.15 | 1.6 | 5N | None | Excellent | Small hole at intersection between extension line of processed portion and medium coat layer |
| Example 4-2 | LLDPE | 40 | Continuous line | Window around fragile processed portion is excluded | 0.15 | 1.6 | 5N | None | Excellent | Small hole at intersection between extension line of processed portion and medium coat layer |
| Example 4-3 | LLDPE | 40 | Continuous line | Strip shape on both sides of processed portion | 0.15 | 1.6 | 5N | None | Excellent | Small hole at intersection between extension line of processed portion and medium coat layer |
| Example 4-4 | LLDPE | 40 | Broken line | Both sides of processed portion | 0.15 | 1.6 | 5N | None | Excellent | Small hole at intersection between extension line of processed portion and medium coat layer |
| Example 4-5 | LLDPE | 40 | Continuous line | No coating | 0.15 | 1.6 | 2N | None | Passing | Processed portion was largely opened |

As shown in Table 4, in Examples 4-1 to 4-4 in which the Young's modulus of the fragile processed portion was set to 2.0 GPa or less and the medium coat layer was provided on both sides of the fragile processed portion in the longitudinal direction, a small hole was formed at the intersection (two places) between the extension line of the fragile processed portion and the medium coat layer during heating, and vapor was discharged to the outside of the packaging bag without causing rupture. In addition, since the expanded state of the packaging bag was held, it was possible to perform steaming.

In Example 4-5 in which no medium coat layer was provided, since a large crack was formed over the entire fragile processed portion, it was possible to suppress the rupture.

EXAMPLE 5 Group

In Example 5 group, each of the outer layer and the inner layer is formed as a single layer.

In Examples 5-1 to 5-3, a PET film having a thickness of 12 μm was used as an outer layer, and an LLDPE film having a thickness of 30 μm or 40 μm was used as an inner layer. The outer layer and the inner layer were bonded to each other by dry lamination using an aliphatic ester based adhesive for dry lamination, and a fragile processed portion having a depth approximately passing through the outer layer was formed in a width of 150 μm and a length of 40 mm by laser irradiation, thereby manufacturing a laminated film.

In Examples 5-4 to 5-6, a PET film having a thickness of 16 μm was used as an outer layer, and an LLDPE film having a thickness of 30 μm or 40 μm was used as an inner layer.

Then, the PET film and the LLDPE film were bonded to each other using the same method. In Examples 5-1 to 5-6, the Young's modulus of the fragile processed portion was in the range of 1.8 GPa to 2.0 GPa.

In Example 5-7, a PET film having a thickness of 12 μm was used as an outer layer, and a low density polyethylene (LDPE) film (having a thickness of 40 μm) was used as an inner layer. In Example 5-7, the Young's modulus of the fragile processed portion was 2.0 GPa.

In Comparative examples 5-A and 5-B, a PET film having a thickness of 12 μm was used as an outer layer, and an unstretched polypropylene (CPP) film (having a thickness of 40 μm) was used as an inner layer. The Young's modulus of the fragile processed portion in Comparative example 5-A was 2.2 GPa, and the Young's modulus of the fragile processed portion in Comparative example 5-B was 2.5 GPa.

Each film of the examples and comparative examples was formed in a bag shape, thereby forming a packaging bag.

For the packaging bags of the examples and the comparative examples described above, a heating experiment using a microwave was performed according to the following procedure.

At the time of packaging bag formation, a cloth that was frozen in a state containing 50-cc water was disposed as contents in a packaging bag, and then the ends of the packaging bag was closed for sealing. The packaging bag containing the contents was heated for two minutes at 600 watts output using a microwave, and the occurrence of rupture and the state of steaming were observed. Table 5 shows the results of Examples 5-1 to 5-7 and Comparative examples 5-A and 5-B.

TABLE 5

| | Outer layer | | Inner layer | | Impact fracture mass (g) | Young's modulus of fragile processed portion | Microwave heating | | |
|---|---|---|---|---|---|---|---|---|---|
| | Material | Thickness (μm) | Material | Thickness (μm) | | | Rupture | Steaming | State |
| Example 5-1 | PET | 12 | LLDPE | 40 | 640 | 1.8 | None | Excellent | Plurality of small holes in processed portion |
| Example 5-2 | PET | 12 | LLDPE | 40 | 627 | 1.6 | None | Excellent | Plurality of small holes in processed portion |
| Example 5-3 | PET | 12 | LLDPE | 30 | 536 | 1.6 | None | Excellent | Plurality of small holes in processed portion |
| Example 5-4 | PET | 16 | LLDPE | 40 | 640 | 2.0 | None | Excellent | Plurality of small holes in processed portion |
| Example 5-5 | PET | 16 | LLDPE | 40 | 627 | 2.0 | None | Excellent | Plurality of small holes in processed portion |
| Example 5-6 | PET | 16 | LLDPE | 30 | 536 | 2.0 | None | Excellent | Plurality of small holes in processed portion |
| Example 5-7 | PET | 12 | LDPE | 40 | 64 | 2.0 | None | Passing | Processed portion was largely opened |
| Comparative example 5-A | PET | 12 | CPP | 40 | 54 | 2.2 | Occurred | Failing | Torn from processed portion |
| Comparative example 5-B | PET | 12 | CPP | 40 | 80 | 2.5 | Occurred | Failing | Sealed portion was torn |

As shown in Table 5, in the packaging bags of the examples, in Examples 5-1 to 5-6 in which the LLDPE film was used as an inner layer, the inner layer was extended easily, a plurality of small holes were formed in the fragile processed portion formed by laser irradiation, and vapor was discharged to the outside of the packaging bag without causing rupture. In addition, since the expanded state of the packaging bag was held, it was possible to perform steaming appropriately. In Example 7 in which LDPE was used to obtain 2.0 GPa as the Young's modulus of the fragile processed portion, the entire fragile processed portion was largely opened to prevent the rupture.

In contrast, in the comparative examples, the resin for forming the inner layer was not LLDPE and accordingly the extension rate was low. For this reason, rupture was caused on the extension line of the fragile processed portion or at the heat-sealed end of the laminated film.

EXAMPLE 6 Group

Example 6 group is examples in which at least one of the outer layer and the inner layer is formed so as to have a plurality of layers.

EXAMPLE 6-1

A PET film having a thickness of 12 μm and an ONy film having a thickness of 15 μm were used as an outer layer, and an LLDPE film having a thickness of 40 μm was used as an inner layer. The PET film and the ONy film and the outer layer and the inner layer were bonded to each other by dry lamination using an aliphatic ester based adhesive for dry lamination, and a fragile processed portion having a depth approximately passing through the outer layer was formed in a width of 150 μm and a length of 40 mm by laser irradiation, thereby manufacturing a laminated film of Example 6-1.

The laminated film of Example 6-1 was formed in a bag shape using the same method as in Example 5-1, thereby manufacturing the packaging bag of the present example.

EXAMPLE 6-2

The configuration of the outer layer and the inner layer was the same as that in Example 6-1.

The films of the outer layer were bonded to each other by dry lamination, and then the outer layer and the inner layer were bonded to each other by performing sandwich lamination using the LDPE as a sand layer. As a result, the laminated film of Example 6-2 in which the outer layer and the inner layer were bonded to each other with an adhesive layer (13 μm in thickness) formed of LDPE interposed therebetween was manufactured. The laminated film of Example 6-2 was formed in a bag shape using the same method as in Example 5-1, thereby manufacturing the packaging bag of the present example.

In Examples 6-1 and 6-2, the Young's modulus of the fragile processed portion was 1.6 GPa.

Table 6 shows the results of heating experiments using a microwave that were performed under the same conditions as in Example 5 group for the packaging bags of Examples 6-1 and 6-2.

TABLE 6

| | Lamination method | Inner layer Impact fracture mass (g) | Fragile processed portion Depth | Young's modulus of fragile processed portion | Microwave heating | | |
|---|---|---|---|---|---|---|---|
| | | | | | Rupture | Steaming | State |
| Example 6-1 | Dry lamination | 627 | Passing through outer layer | 1.6 | None | Excellent | Plurality of small holes in processed portion |

TABLE 6-continued

| | Lamination method | Inner layer Impact fracture mass (g) | Fragile processed portion Depth | Young's modulus of fragile processed portion | Microwave heating Rupture | Steaming | State |
|---|---|---|---|---|---|---|---|
| Example 6-2 | Sandwich lamination | 627 | Passing through outer layer | 1.6 | None | Excellent | Plurality of small holes in processed portion |

As shown in Table 6, in Examples 6-1 and 6-2, a plurality of small holes were formed in the fragile processed portion during heating, and vapor was discharged to the outside of the packaging bag without causing rupture. In addition, since the expanded state of the packaging bag was held, it was possible to perform steaming.

EXAMPLE 7 Group

Example 7 group is examples in which an ink layer for reducing the lamination strength is provided as an intermediate layer.

EXAMPLE 7-1

A PET film having a thickness of 12 μm was used as an outer layer, and an LLDPE film having a thickness of 40 μm was used as an inner layer. An ink layer was formed on one surface of the PET film by printing using white ink, but no ink layer was formed in an approximate strip region spreading in a width of 2.5 mm on four sides of the linear fragile processed portion (size and forming method are the same as those in Example 5-1). The surface of the outer layer on which the inner layer was provided and the inner layer were bonded to each other by dry lamination using an aliphatic ester based adhesive for dry lamination and the fragile processed portion was formed by laser irradiation, thereby manufacturing the laminated film of Example 7-1.

The laminated film of Example 7-1 was formed in a bag shape using the same method as in Example 5-1, thereby manufacturing the packaging bag of the present example.

EXAMPLE 7-2

Example 7-2 is different from Example 7-1 in that an LLDPE film having a thickness of 30 μm is used. In addition, the shape of the fragile processed portion in planar view in Example 7-2 is different from that in Example 7-1. The fragile processed portion was formed in a broken line shape by laser irradiation. The broken line shape was formed by repeatedly forming a groove having a length of 1 mm 30 times with a distance of 0.1 mm therebetween.

EXAMPLES 7-3 to 7-7

The only difference between Examples 7-3 to 7-7 and Example 7-1 is the shape of the fragile processed portion in planar view. FIGS. 8A to 8E show the shape of the fragile processed portion in planar view in Examples 7-3 to 7-7.

EXAMPLE 7-8

Except that the ink layer was formed on one entire surface of the PET film (that is, except that there was no region where the ink layer was not formed), the laminated film and the packaging bag in Example 7-8 were manufactured in the same procedure as in Example 7-1.

In Examples 7-1 to 7-8, the Young's modulus of the fragile processed portion was 1.6 GPa.

Table 7 shows the results of heating experiments using a microwave that were performed under the same conditions as in Example 5 group for the packaging bags of Examples 7-1 to 7-8.

TABLE 7

| | Inner layer | | | Fragile processed portion | | Young's modulus of fragile processed portion | Microwave heating | | |
|---|---|---|---|---|---|---|---|---|---|
| | Material | Thickness | Impact fracture mass (g) | Shape | Ink lamination pattern | | Rupture | Steaming | State |
| Example 7-1 | LLDPE | 40 | 627 | Continuous line | Window around fragile processed portion is excluded | 1.6 | None | Excellent | Plurality of small holes in processed portion |
| Example 7-2 | LLDPE | 30 | 627 | Broken line | Window around fragile processed portion is excluded | 1.6 | None | Excellent | Plurality of small holes in processed portion |
| Example 7-3 | LLDPE | 40 | 627 | 8A | Window around fragile processed portion is excluded | 1.6 | None | Excellent | Plurality of small holes in processed portion |
| Example 7-4 | LLDPE | 40 | 627 | 8B | Window around fragile processed portion is excluded | 1.6 | None | Excellent | Plurality of small holes in processed portion |
| Example 7-5 | LLDPE | 40 | 627 | 8C | Window around fragile processed portion is excluded | 1.6 | None | Excellent | Plurality of small holes in processed portion |
| Example 7-6 | LLDPE | 40 | 627 | 8D | Window around fragile processed portion is Good excluded | 1.6 | None | Excellent | Plurality of small holes in processed portion |

TABLE 7-continued

| | Inner layer | | | Fragile processed portion | | Young's modulus of fragile processed portion | Microwave heating | | |
|---|---|---|---|---|---|---|---|---|---|
| | Material | Thickness | Impact fracture mass (g) | Shape | Ink lamination pattern | | Rupture | Steaming | State |
| Example 7-7 | LLDPE | 40 | 627 | 8E | Window around fragile processed portion is excluded | 1.6 | None | Excellent | Plurality of small holes in processed portion |
| Example 7-8 | LLDPE | 40 | 627 | Continuous line | Entire surface coated | 1.6 | None | Excellent | Vapor was ejected since the number of small holes was small |

As shown in Table 7, in Examples 7-1 to 7-3 in which no ink layer was formed around the fragile processed portion, a plurality of small holes were formed in the fragile processed portion during heating, and vapor was discharged to the outside of the packaging bag without causing rupture. In addition, since the expanded state of the packaging bag was held, it was possible to perform steaming. In Examples 7-2 to 7-7, it became easy to distinguish the fragile processed portion from a scratch, a pinhole, or the like formed unintentionally in the manufacturing process of the packaging bag by forming the fragile processed portion in a characteristic shape instead of the mere linear shape. In Example 7-6, the test piece was manufactured in a shape shown by the dotted line of FIG. 8D. However, it is thought that the same result is obtained if the intersection of the fragile processed portion is disposed near the center of the test piece.

On the other hand, although it was also possible to perform steaming while suppressing the rupture in the example 7-8, a phenomenon that vapor was ejected from the packaging bag was observed since the number of small holes formed in the fragile processed portion was smaller than that in the other examples. Accordingly, when providing the ink layer, it was preferable to avoid the periphery of the fragile processed portion.

EXAMPLE 8 Group

Example 8 group is examples in which a strong lamination layer for increasing the lamination strength is provided as an intermediate layer.

EXAMPLE 8-1

A PET film having a thickness of 12 μm was used as an outer layer, and an LLDPE film having a thickness of 40 μm was used as an inner layer. In addition, a medium coat layer (strong lamination layer) of 10 mm×5 mm was formed on both sides of a region for forming the fragile processed portion in the longitudinal direction, on one surface of the outer layer, by printing. The surface of the outer layer on which the medium coat layer was provided and the inner layer were bonded to each other by dry lamination using an aliphatic ester based adhesive for dry lamination. Then, by laser irradiation, a fragile processed portion having a depth approximately passing through the outer layer was formed in a width of 150 μm and a length of 40 mm so as to be located between two medium coat layers in planar view, thereby manufacturing the laminated film of Example 8-1. In the laminated film of Example 8-1, the lamination strength between the outer layer and the inner layer in the medium coat layer was 5 N/25 mm.

The laminated film of Example 8-1 was formed in a bag shape using the same method as in Example 5-1, thereby manufacturing the packaging bag of the present example.

EXAMPLE 8-2

Except that the medium coat layer was formed on the entire surface of the PET film excluding a non-formation region of 50 mm×5 mm and the fragile processed portion was formed so as to be located in the non-formation region in planar view, the laminated film and the packaging bag were manufactured in the same procedure as in Example 8-1. The lamination strength between the outer layer and the inner layer in the medium coat layer was 5 N/25 mm.

EXAMPLE 8-3

Except that the medium coat layer was formed on the entire surface of the PET film excluding a non-formation region, which is formed with a width of 50 mm from one end to the other end in the width direction of the PET film, and the fragile processed portion was formed so as to be located in the non-formation region in planar view, the laminated film and the packaging bag were manufactured in the same procedure as in Example 8-1. The lamination strength between the outer layer and the inner layer in the medium coat layer was 5 N/25 mm.

EXAMPLE 8-4

Except that the shape of the fragile processed portion was the same as that in Example 7-2, the laminated film and the packaging bag were manufactured in the same procedure as in Example 8-1. The lamination strength between the outer layer and the inner layer in the medium coat layer was 5 N/25 mm.

In Examples 8-1 to 8-4, the Young's modulus of the fragile processed portion was 1.6 GPa.

Table 8 shows the results of heating experiments using a microwave that were performed under the same conditions as in Example 5 group for the packaging bags of Examples 8-1 to 8-4.

TABLE 8

| | Inner layer | | Fragile processed portion | | Lamination strength of processed portion | Young's modulus of fragile processed portion | Microwave heating | | |
|---|---|---|---|---|---|---|---|---|---|
| | Material | Thickness | Shape | Medium coat layer | | | Rupture | Steaming | State |
| Example 8-1 | LLDPE | 40 | Continuous line | Both sides of processed portion | 5N | 1.6 | None | Exellent | Small hole at intersection between extension line of processed portion and medium coat layer |
| Example 8-2 | LLDPE | 40 | Continuous line | Window around fragile processed portion is excluded | 5N | 1.6 | None | Exellent | Small hole at intersection between extension line of processed portion and medium coat layer |
| Example 8-3 | LLDPE | 40 | Continuous line | Strip shape on both sides of processed portion | 5N | 1.6 | None | Exellent | Small hole at intersection between extension line of processed portion and medium coat layer |
| Example 8-4 | LLDPE | 40 | Dotted line | Both sides of processed portion | 5N | 1.6 | None | Exellent | Small hole at intersection between extension line of processed portion and medium coat layer |

As shown in Table 8, in Examples 8-1 to 8-4 in which the medium coat layer was provided on both sides of the fragile processed portion in the longitudinal direction, a small hole was formed at the intersection (two places) between the extension line of the fragile processed portion and the medium coat layer during heating, and vapor was discharged to the outside of the packaging bag without causing rupture. In addition, since the expanded state of the packaging bag was held, it was possible to perform steaming.

EXAMPLE 9 Group

Example 9 group is examples in which an ink layer for reducing the lamination strength is provided as an intermediate layer.

EXAMPLE 9-1

A PET film having a thickness of 12 μm was used as an outer layer, and an LLDPE film (Young's modulus of 0.15 GPa) having a thickness of 40 μm was used as an inner layer. An ink layer was formed on one surface of the PET film except for a rectangular region of 50 mm×5 mm by printing using ink. Then, the surface of the outer layer on which the ink layer was provided and the inner layer were bonded to each other by dry lamination using an aliphatic ester based adhesive for dry lamination. Then, by laser irradiation, a fragile processed portion having a depth approximately passing through the outer layer was formed in a width of 150 μm and a length of 40 mm so as to be located in a region where no ink layer was formed in planar view, thereby manufacturing the laminated film of Example 9-1. In the laminated film of Example 9-1, the Young's modulus of the fragile processed portion was 1.6 GPa.

The laminated film of Example 9-1 was formed in a bag shape using the same method as in Example 1-1, thereby manufacturing the packaging bag of the present example.

EXAMPLE 9-2

Except that an LLDPE film having a Young's modulus of 0.27 GPa was used as an inner layer, the laminated film and the packaging bag were manufactured in the same procedure as in Example 9-1. The Young's modulus of the fragile processed portion was 1.8 GPa.

EXAMPLE 9-3

Except that a PET film having a thickness of 16 μm was used as an outer layer, the laminated film and the packaging bag were manufactured in the same procedure as in Example 9-1. The Young's modulus of the fragile processed portion was 2.0 GPa.

EXAMPLE 9-4

Except that a PET film having a thickness of 25 μm was used as an outer layer, the laminated film and the packaging bag were manufactured in the same procedure as in Example 9-1. The Young's modulus of the fragile processed portion was 2.6 GPa.

EXAMPLE 9-5

In Example 9-5, except that an LLDPE film having a thickness of 30 μm was used as an inner layer and that the inner layer and the outer layer were bonded to each other by applying an anchor coat (AC) agent formed of LDPE on the printing surface of the outer layer and performing extrusion lamination, the laminated film and the packaging bag were manufactured in the same procedure as in Example 9-1. The thickness of the LDPE formed between the outer layer and the inner layer was 20 and the Young's modulus of the fragile processed portion was 1.6 GPa.

COMPARATIVE EXAMPLE 9-A

Except that a PET film having a thickness of 25 μm was used as an outer layer and an LLDPE film having a Young's modulus of 0.45 GPa was used as an inner layer, the laminated film and the packaging bag were manufactured in the same procedure as in Example 9-1. The Young's modulus of the fragile processed portion was 2.8 GPa.

Table 9 shows the results of heating experiments using a microwave that were performed under the same conditions as in Example 5 group for the packaging bags of Examples 9-1 to 9-5 and Comparative example 9-A.

TABLE 9

| | Outer layer | | Anchor coat agent | | Inner layer | | Fragile processed portion | |
|---|---|---|---|---|---|---|---|---|
| | Material | Thickness | Material | Thickness | Material | Thickness | Shape | Ink lamination pattern |
| Example 9-1 | PET | 12 | None | | LLDPE | 40 | Continuous line | Window around fragile processed portion is excluded |
| Example 9-2 | | 12 | | | LLDPE | 40 | Continuous line | Window around fragile processed portion is excluded |
| Example 9-3 | | 16 | | | LLDPE | 40 | Continuous line | Window around fragile processed portion is excluded |
| Example 9-4 | | 25 | | | LLDPE | 40 | Continuous line | Window around fragile processed portion is excluded |
| Example 9-5 | | 12 | LDPE | 20 | LLDPE | 30 | Continuous line | Window around fragile processed portion is excluded |
| Comparative example 9-A | | 25 | None | | LLDPE | 40 | Continuous line | Window around fragile processed portion is excluded |

| | Young's modulus of inner layer (GPa) | Young's modulus of fragile processed portion (GPa) | Microwave heating | | |
|---|---|---|---|---|---|
| | | | Rupture | Steaming | State |
| Example 9-1 | 0.15 | 1.6 | None | Exellent | Plurality of small holes in processed portion |
| Example 9-2 | 0.27 | 1.8 | None | Exellent | Plurality of small holes in processed portion |
| Example 9-3 | 0.15 | 2.0 | None | Exellent | Plurality of small holes in processed portion |
| Example 9-4 | 0.15 | 2.6 | None | Exellent | Plurality of small holes in processed portion |
| Example 9-5 | 0.15 | 1.6 | None | Exellent | Plurality of small holes in processed portion |
| Comparative example 9-A | 0.45 | 2.8 | Occurred | Failing | Sealed portion was torn |

As shown in Table 9, in Examples 9-1 to 9-5 in which the Young's modulus of the fragile processed portion of the LLDPE film was set to be less than 2.8 GPa, a plurality of small holes were formed in the fragile processed portion during heating, and vapor was discharged to the outside of the packaging bag without causing rupture. In addition, since the expanded state of the packaging bag was held, it was possible to perform steaming.

In contrast, in Comparative example 9-A, since the Young's modulus of the fragile processed portion was 2.8 or more, the seal portion caused rupture.

EXAMPLE 10 Group

Example 10 group is examples regarding laminated films having various layer structures.

EXAMPLE 10-1

A PET film having a thickness of 12 μm was used as an outer layer, and an LLDPE film (Young's modulus of 0.15 GPa) having a thickness of 40 μm was used as an inner layer. The outer layer and the inner layer were bonded to each other by dry lamination using an aliphatic ester based adhesive for dry lamination, and a fragile processed portion having a depth approximately passing through the outer layer was formed in a width of 150 μm and a length of 40 μm by laser irradiation, thereby manufacturing a laminated film of Example 10-1.

In the laminated film of Example 10-1, the Young's modulus of the fragile processed portion measured by using the above-described method was 1.6 GPa. The lamination strength between the outer layer and the inner layer that was measured in a 80° C. environment after leaving the laminated film in a 80° C. environment for two minutes was 3 N/25 mm.

EXAMPLE 10-2

Except that an ink layer was formed on one surface of the PET film excluding a rectangular region of 50 mm×5 mm by printing using ink and then the surface of the outer layer on which the ink layer was provided and the inner layer were bonded to each other by dry lamination using an aliphatic ester based adhesive for dry lamination, the laminated film and the packaging bag were manufactured in the same procedure as in Example 10-1.

In the laminated film of Example 10-2, the Young's modulus of the fragile processed portion was 1.6 GPa. The lamination strength between the outer layer and the inner layer that was measured in a 80° C. environment after leaving the laminated film in a 80° C. environment for two minutes was 1.2 N/25 mm.

EXAMPLE 10-3

Except that the inner layer and the outer layer were bonded to each other by applying an anchor coat (AC) agent formed of LDPE on the printing surface of the outer layer and performing extrusion lamination, the laminated film and the packaging bag were manufactured in the same procedure as in Example 10-1.

In the laminated film of Example 10-3, the Young's modulus of the fragile processed portion was 1.6 GPa. The lamination strength between the outer layer and the inner layer that was measured in a 80° C. environment after leaving the laminated film in a 80° C. environment for two minutes was 2 N/25 mm.

EXAMPLE 10-4

Except that an LLDPE film having a thickness of 30 μm was used as an inner layer and that heat-seal (HS) varnish was formed on one entire surface of the PET film by printing using the HS varnish and then the surface of the outer layer on which the ink layer was provided and the inner layer were bonded to each other by dry lamination using an aliphatic ester based adhesive for dry lamination, the laminated film and the packaging bag were manufactured in the same procedure as in Example 10-1.

In the laminated film of Example 10-4, the Young's modulus of the fragile processed portion was 1.6 GPa. The lamination strength between the outer layer and the inner layer that was measured in a 80° C. environment after leaving the laminated film in a 80° C. environment for two minutes was 0.05 N/25 mm.

EXAMPLE 10-5

Except that an LDPE film (Young's modulus of 0.3 GPa) having a thickness of 40 was used as an inner layer, the laminated film and the packaging bag were manufactured in the same procedure as in Example 10-1.

In the laminated film of Example 10-5, the Young's modulus of the fragile processed portion was 2.0 GPa. The lamination strength between the outer layer and the inner layer that was measured in a 80° C. environment after leaving the laminated film in a 80° C. environment for two minutes was 3 N/25 mm.

COMPARATIVE EXAMPLE 10-A

Except that a CPP film (Young's modulus of 0.7 GPa) having a thickness of 40 μm was used as an inner layer, the laminated film and the packaging bag were manufactured in the same procedure as in Example 10-1.

In the laminated film of Comparative example 10-A, the Young's modulus of the fragile processed portion was 2.5 GPa. The lamination strength between the outer layer and the inner layer that was measured in a 80° C. environment after leaving the laminated film in a 80° C. environment for two minutes was 3 N/25 mm.

EXAMPLE 10-6

Except that a PET film having a thickness of 16 μm was used as an outer layer, the laminated film and the packaging bag were manufactured in the same procedure as in Example 10-1.

In the laminated film of Example 10-6, the Young's modulus of the fragile processed portion was 2.2 GPa. The lamination strength between the outer layer and the inner layer that was measured in a 80° C. environment after leaving the laminated film in a 80° C. environment for two minutes was 3 N/25 mm.

EXAMPLE 10-7

Except that a PET film having a thickness of 16 μm was used as an outer layer and that HS varnish was formed on one entire surface of the PET film by printing using the HS varnish and then the surface of the outer layer on which the ink layer was provided and the inner layer were bonded to each other by dry lamination using an aliphatic ester based adhesive for dry lamination, the laminated film and the packaging bag were manufactured in the same procedure as in Example 10-1.

In the laminated film of Example 10-7, the Young's modulus of the fragile processed portion was 2.2 GPa. The lamination strength between the outer layer and the inner layer that was measured in a 80° C. environment after leaving the laminated film in a 80° C. environment for two minutes was 0.05 N/25 mm.

EXAMPLE 10-8

Except that a PET film having a thickness of 25 μm was used as an outer layer and a CPP film having a Young's modulus of 0.27 GPa was used as an inner layer, the laminated film and the packaging bag were manufactured using the same procedure as in Example 10-1.

In the laminated film of Example 10-8, the Young's modulus of the fragile processed portion was 2.6 GPa. The lamination strength between the outer layer and the inner layer that was measured in a 80° C. environment after leaving the laminated film in a 80° C. environment for two minutes was 3 N/25 mm.

EXAMPLE 10-9

Except that a PET film having a thickness of 25 μm was used as an outer layer and a CPP film having a Young's modulus of 0.27 GPa was used as an inner layer and that HS varnish was formed on one entire surface of the PET film by printing using the HS varnish and then the surface of the outer layer on which the HS varnish layer was provided and the inner layer were bonded to each other by dry lamination using an aliphatic ester based adhesive for dry lamination, the laminated film and the packaging bag were manufactured in the same procedure as in Example 10-1.

In the laminated film of Example 10-9, the Young's modulus of the fragile processed portion was 2.6 GPa. The lamination strength between the outer layer and the inner layer that was measured in a 80° C. environment after leaving the laminated film in a 80° C. environment for two minutes was 0.05 N/25 mm.

COMPARATIVE EXAMPLE 10-B

Except that a PET film having a thickness of 25 μm was used as an outer layer and a CPP film having a Young's modulus of 0.45 GPa was used as an inner layer, the laminated film and the packaging bag were manufactured in the same procedure as in Example 10-1.

In the laminated film of Comparative example 10-B, the Young's modulus of the fragile processed portion was 2.8

GPa. The lamination strength between the outer layer and the inner layer that was measured in a 80° C. environment after leaving the laminated film in a 80° C. environment for two minutes was 3 N/25 mm.

Table 10 shows the results of heating experiments using a microwave that were performed under the same conditions as in Example 5 group for the packaging bags of Examples 10-1 to 10-9 and Comparative examples 10-A and 10-B.

not limited to the above embodiments, and it is possible to change the components in various ways, or remove the components, or combine the components of the embodiments without departing from the scope of the invention.

Figure 9:
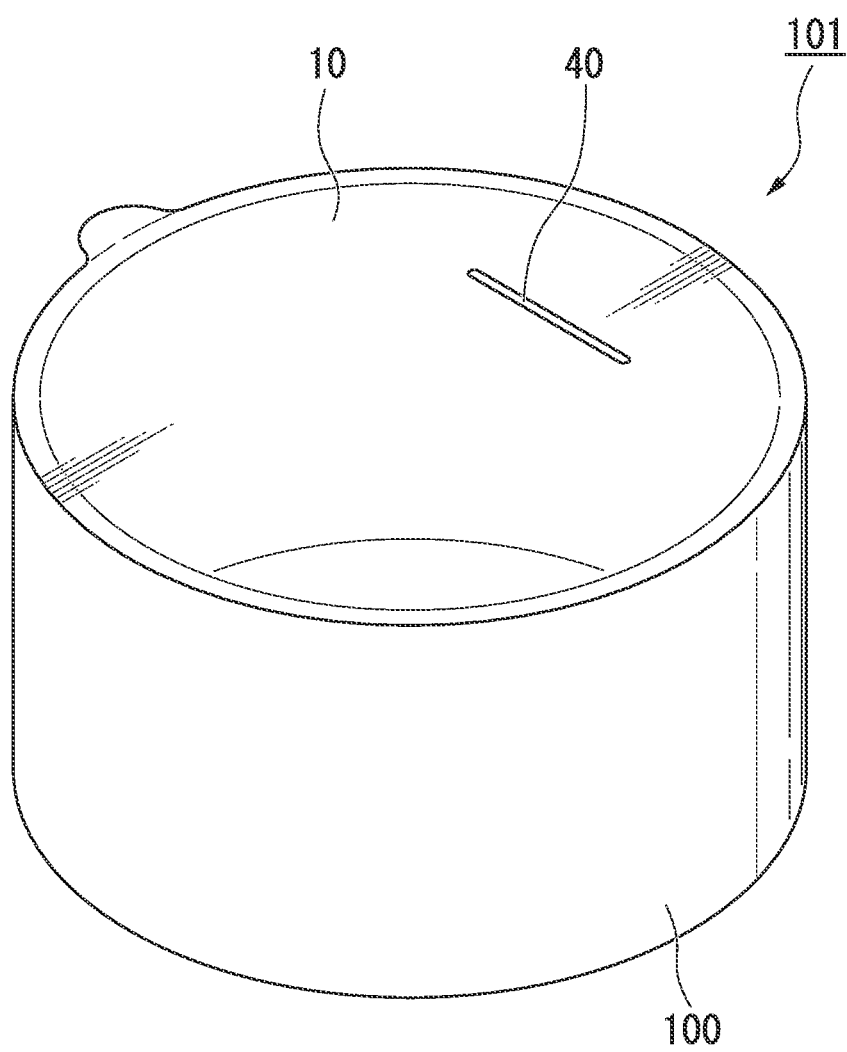
FIG. 9 is a perspective view showing a modification example of a packaging container of the invention.

For example, the laminated film of the invention is also available for packaging containers other than the packaging bag. FIG. 9 shows an example of a packaging container 101 in which the laminated film 10 is attached as a lid to a

TABLE 10

| | Outer layer | | Inner layer | | Lamination strength between inner layer and outer layer | | Young's modulus of inner layer (GPa) | Young's modulus of fragile processed portion (GPa) | Microwave heating | | |
|---|---|---|---|---|---|---|---|---|---|---|---|
| | Material | Thickness | Material | Thickness | Peeling interface | Lamination strength under heating environment | | | Rupture | Steaming | State |
| Example 10-1 | PET | 12 | LLDPE | 40 | Adhesive layer | 3N | 0.15 | 1.6 | None | Excellent | Plurality of small holes in processed portion |
| Example 10-2 | | 12 | LLDPE | 40 | Ink layer | 1.2N | 0.15 | 1.6 | None | Excellent | Vapor was ejected since the number of small holes was small |
| Example 10-3 | | 12 | LLDPE | 40 | PET/AC interface | 2N | 0.15 | 1.6 | None | Excellent | Plurality of small holes in processed portion |
| Example 10-4 | | 12 | LLDPE | 40 | HS varnish layer | 0.05N | 0.15 | 1.6 | None | Passing | Processed portion was largely opened |
| Example 10-5 | | 12 | LDPE | 40 | Adhesive layer | 3N | 0.3 | 2.0 | None | Passing | Processed portion was largely opened |
| Comparative example 10-A | | 12 | CPP | 40 | Adhesive layer | 3N | 0.7 | 2.5 | Occurred | Failing | Sealed portion was torn |
| Example 10-6 | | 16 | LLDPE | 40 | Adhesive layer | 3N | 0.15 | 2.2 | None | Excellent | Plurality of small holes in processed portion |
| Example 10-7 | | 16 | LLDPE | 40 | HS varnish layer | 0.05N | 0.15 | 2.2 | None | Passing | Processed portion was largely opened |
| Example 10-8 | | 25 | LLDPE | 40 | Adhesive layer | 3N | 0.27 | 2.6 | None | Excellent | Plurality of small holes in processed portion |
| Example 10-9 | | 25 | LLDPE | 40 | HS varnish layer | 0.05N | 0.27 | 2.6 | None | Passing | Processed portion was largely opened |
| Comparative example 10-B | | 25 | LLDPE | 40 | Adhesive layer | 3N | 0.45 | 2.8 | Occurred | Failing | Sealed portion was torn |

As shown in Table 10, in Examples 10-1, 10-2, 10-3, 10-6, and 10-8 in which the Young's modulus of the fragile processed portion of the LLDPE film was set to be less than 2.8 GPa and the lamination strength was set to 0.1 N/25 mm or more, a plurality of small holes were formed in the fragile processed portion during heating, and vapor was discharged to the outside of the packaging bag without causing rupture. In addition, since the expanded state of the packaging bag was held, it was possible to perform steaming.

In Examples 10-4, 10-5, 10-7, and 10-9, the entire fragile processed portion was largely opened, and it was possible to prevent the rupture.

In contrast, in Comparative example 10-A, since the LLDPE film was not used as an inner layer and the Young's modulus of the fragile processed portion was larger than 2.0, the fragile processed portion tore to cause rupture. In addition, in Comparative example 10-B, since the Young's modulus of the fragile processed portion was 2.8 or more, the seal portion caused rupture.

While the embodiments and the examples of the invention have been described, the technical scope of the invention is container body 100 formed of paper or the like. Also in this case, when heating the packaging container 101 in a microwave, it is possible to perform steaming while appropriately discharging vapor from the fragile processed portion 40 so that rupture or the like is prevented.

In addition, the laminated film of the invention may be manufactured in a roll shape by forming the fragile processed portion and then winding it using a so-called roll-to-roll method. In this case, the extension direction of the fragile processed portion may be parallel to the winding direction. However, if the fragile processed portion is formed so as to be oblique to the winding direction, it is possible to appropriately prevent the occurrence of irregularities in the roll on which the laminated film is wound because the fragile processed portion is not present continuously in the winding direction. As a result, it is possible to perform storage, transport, and the like appropriately.

The shape of the fragile processed portion can be changed in various ways other than the above. For example, the fragile processed portion may be formed without removing the outer layer by performing so-called half-cut processing using cutter processing, such as a rotary die cutter. In addition, the shape is not limited to the line shape extending in one direction, and the fragile processed portion may have a bent or curved portion, or may be formed in a linear shape obtained by connecting a plurality of line segments to each other.

What is claimed is:

1. A laminated film comprising:
an inner layer formed of a heat-sealable thermoplastic resin;
an outer layer laminated on the inner layer; and
an intermediate layer provided between the inner layer and the outer layer,
wherein
an inner layer portion of the inner layer and an outer layer portion of the outer layer form a fragile processed portion, from which a part of the outer layer portion is removed and a part of the inner layer portion is present under the removed part of the outer layer portion, the fragile processed portion having a linear shape in planar view and a Young's modulus of 2.0 gigapascals or less, and
the intermediate layer is not provided between the inner layer portion and the outer layer portion.

2. A laminated film, comprising:
an inner layer formed of a linear low density polyethylene resin, the inner layer being heat-sealable;
an outer layer laminated on the inner layer; and
an intermediate layer provided between the inner layer and the outer layer,
wherein
an inner layer portion of the inner layer and an outer layer portion of the outer layer form a fragile processed portion from which a part of the outer layer portion is removed and a part of the inner layer portion is present under the outer layer portion, the fragile processed portion having a linear shape in planar view and a Young's modulus less than 2.8 gigapascals, and
the intermediate layer is not provided between the inner layer portion and the outer layer portion.

3. The laminated film according to claim 1,
wherein a lamination strength between the inner layer and the outer layer under a heating environment near the fragile processed portion is equal to or greater than 0.1 N/25 mm.

4. The laminated film according to claim 2,
wherein a lamination strength between the inner layer and the outer layer under a heating environment near the fragile processed portion is equal to or greater than 0.1 N/25 mm.

5. The laminated film according to claim 1,
wherein the fragile processed portion is formed by laser irradiation.

6. The laminated film according to claim 2,
wherein the fragile processed portion is formed by laser irradiation.

7. The laminated film according to claim 1,
wherein the intermediate layer is an ink layer for reducing a lamination strength between the inner layer and the outer layer, and is formed in a region excluding the fragile processed portion and a periphery of the fragile processed portion in planar view.

8. The laminated film according to claim 2,
wherein the intermediate layer is an ink layer for reducing a lamination strength between the inner layer and the outer layer, and is formed in a region excluding the fragile processed portion and a periphery of the fragile processed portion in planar view.

9. The laminated film according to claim 1,
wherein the intermediate layer is a strong lamination layer increasing a lamination strength between the inner layer and the outer layer, and is formed in a region including both sides of the fragile processed portion in a longitudinal direction of the fragile processed portion in planar view.

10. The laminated film according to claim 2,
wherein the intermediate layer is a strong lamination layer increasing a lamination strength between the inner layer and the outer layer, and is formed in a region including both sides of the fragile processed portion in a longitudinal direction of the fragile processed portion in planar view.

11. A packaging container, comprising:
the laminated film according to claim 1,
wherein a plurality of small holes are configured to be formed in the fragile processed portion during heating by a microwave.

12. A packaging container, comprising:
the laminated film according to claim 2,
wherein a plurality of small holes are configured to be formed in the fragile processed portion during heating by a microwave.

13. The laminated film according to claim 1,
wherein the intermediate layer is, in planar view, separated from entirety of the fragile processed portion.

* * * * *